(12) United States Patent
Nakanishi et al.

(10) Patent No.: US 11,291,956 B2
(45) Date of Patent: Apr. 5, 2022

(54) HOLLOW FIBER MEMBRANE MODULE AND METHOD OF CLEANING SAME

(71) Applicant: Kuraray Co., Ltd., Kurashiki (JP)

(72) Inventors: Hiroki Nakanishi, Okayama (JP); Koji Miyake, Okayama (JP); Kazuma Inoue, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 886 days.

(21) Appl. No.: 15/776,856

(22) PCT Filed: Nov. 15, 2016

(86) PCT No.: PCT/JP2016/083822
§ 371 (c)(1),
(2) Date: May 17, 2018

(87) PCT Pub. No.: WO2017/086313
PCT Pub. Date: May 26, 2017

(65) Prior Publication Data
US 2018/0333681 A1  Nov. 22, 2018

(30) Foreign Application Priority Data
Nov. 19, 2015  (JP) .............................. JP2015-226380

(51) Int. Cl.
*B01D 65/02* (2006.01)
*B01D 63/02* (2006.01)
(Continued)

(52) U.S. Cl.
CPC ............ *B01D 65/02* (2013.01); *B01D 63/02* (2013.01); *B01D 69/08* (2013.01); *B01D 71/34* (2013.01);
(Continued)

(58) Field of Classification Search
CPC .......... B01D 2321/185; B01D 2313/26; B01D 65/02; B01D 63/02; B01D 2315/06;
(Continued)

(56) References Cited

U.S. PATENT DOCUMENTS 4,876,006 A * 10/1989 Ohkubo ................. B01D 63/02
                                                   210/321.69
5,639,373 A    6/1997 Mahendran et al.
(Continued)

FOREIGN PATENT DOCUMENTS

| CN | 102658031 A | 9/2012 |
| CN | 103889558 A | 6/2014 |

(Continued)

OTHER PUBLICATIONS

Extended European Search Report dated Jun. 4, 2019 in Patent Application No. 16866314.4, therein, 7 pages.
(Continued)

*Primary Examiner* — Ana M Fortuna
(74) *Attorney, Agent, or Firm* — Oblon, McClelland, Maier & Neustadt, L.L.P.

(57) ABSTRACT

The hollow fiber membrane module contains a hollow fiber membrane bundle having bundled hollow fiber membranes, a housing with an internal space formed in which the hollow fiber membrane bundle is housed and a gas supply portion which disperses cleaning gas for the hollow fiber membrane in the internal space. The internal space has an upper space in which an upper-side part of the hollow fiber membrane is positioned and a lower space in which a lower-side part of the hollow fiber membrane is positioned. The gas supply portion is provided with pipe vent holes which disperse gas in the housing at a position in the upper space and diffusing vent holes which disperse gas in the housing at a position below the lower space.

20 Claims, 27 Drawing Sheets

(51) Int. Cl.
*B01D 69/08* (2006.01)
*B01D 71/34* (2006.01)

(52) U.S. Cl.
CPC ........ *B01D 63/024* (2013.01); *B01D 2313/26* (2013.01); *B01D 2315/20* (2013.01); *B01D 2321/18* (2013.01); *B01D 2321/185* (2013.01)

(58) Field of Classification Search
CPC .... B01D 65/08; B01D 61/20; B01D 2321/04; B01D 2313/10; B01D 63/024; B01D 2319/04; B01D 63/043; B01D 61/18; B01D 2313/08; C02F 1/444; C02F 3/1268
See application file for complete search history.

(56) References Cited

U.S. PATENT DOCUMENTS

| | | | |
|---|---|---|---|
| 5,783,083 A | 7/1998 | Henshaw et al. | |
| RE37,549 E | 2/2002 | Mahendran et al. | |
| 6,755,894 B2* | 6/2004 | Bikson | B01D 53/22 210/321.8 |
| 6,841,070 B2* | 1/2005 | Zha | B01D 65/08 210/321.69 |
| 7,063,788 B2* | 6/2006 | Mahendran | B01D 63/026 210/321.69 |
| 7,087,173 B2* | 8/2006 | Cote | B01D 65/08 210/650 |
| RE39,294 E | 9/2006 | Mahendran et al. | |
| 7,534,353 B2* | 5/2009 | Behmann | B01D 63/022 210/636 |
| RE42,669 E | 9/2011 | Henshaw et al. | |
| 2002/0070157 A1 | 6/2002 | Yamada | |
| 2003/0150807 A1* | 8/2003 | Bartels | B01D 65/02 210/636 |
| 2006/0196831 A1* | 9/2006 | Vossenkaul | B01D 63/043 210/636 |
| 2007/0163942 A1* | 7/2007 | Tanaka | B01D 63/043 210/321.89 |
| 2009/0255872 A1* | 10/2009 | Busnot | B01D 65/08 210/636 |
| 2010/0155334 A1* | 6/2010 | Taniguchi | B01D 63/02 210/650 |
| 2010/0300947 A1 | 12/2010 | Sun | |
| 2015/0053085 A1* | 2/2015 | Mahley, III | B01D 63/024 96/8 |
| 2015/0182916 A1* | 7/2015 | Kanai | C02F 1/444 210/321.89 |
| 2018/0111096 A1* | 4/2018 | Tanaka | C02F 1/44 |
| 2018/0111097 A1* | 4/2018 | Tanaka | C02F 3/1273 |
| 2020/0016544 A1* | 1/2020 | Tada | B01D 65/06 |
| 2020/0171440 A1* | 6/2020 | Tada | B01D 63/024 |

FOREIGN PATENT DOCUMENTS

| | | |
|---|---|---|
| EP | 1 252 921 A | 10/2002 |
| JP | 7-136469 A | 5/1995 |
| JP | 9-138298 A | 5/1997 |
| JP | 11-9970 A | 1/1999 |
| JP | 11-33367 A | 2/1999 |
| JP | 11-70324 A | 3/1999 |
| JP | 2002-273179 A | 9/2002 |
| JP | 2007-289940 A | 11/2007 |
| JP | 2012-115747 A | 6/2012 |
| KR | 10-2005-0046718 A | 5/2005 |
| WO | WO 2009/006850 A1 | 1/2009 |
| WO | WO 2011/150210 A2 | 12/2011 |

OTHER PUBLICATIONS

Combined Search Report and Written Opinion dated Nov. 8, 2018 in Singaporean Patent Application No. 11201803997R, 11 pages.
International Search Report dated Feb. 21, 2017 in PCT/JP2016/083822 filed Nov. 15, 2016.
Combined Taiwanese Office Action and Search Report dated Mar. 28, 2018 in Patent Application No. 105137557 (with English summary).
Korean Office Action dated Aug. 28, 2019, in Patent Application No. 10-2018-7017062, 15 pages (with unedited computer generated English translation).

* cited by examiner

FIG.7

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE BUBBLING | | | | ○ | | ○ | |
| | WATER DISCHARGING | | | | ○ | ○ | | |
| | WATER FILLING (BEFORE UPPER-SIDE BUBBLING) | ○ | | | ○ | | | |
| | UPPER-SIDE BUBBLING | | | | ○ | | | ○ |
| | WATER DISCHARGING | | | | ○ | ○ | | |

FIG.17

| STEP | | VALVE NO. | | | | | | |
|---|---|---|---|---|---|---|---|---|
| | | 22 | 34 | 71 | 62 | 42 | 35 | 36 |
| | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE BUBBLING + WATER DISCHARGING (COUNTERCURRENT BUBBLING) | | | | ○ | ○ | ○ | |
| | WATER DISCHARGING (BEFORE UPPER-SIDE BUBBLING) | ○ | | | ○ | | | |
| | UPPER-SIDE BUBBLING | | | | ○ | | | ○ |
| | WATER DISCHARGING | | | | ○ | ○ | | |

FIG.22

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE BUBBLING + WATER DISCHARGING (COUNTERCURRENT BUBBLING) | | | | | ○ | ○ | |
| | WATER FILTERING (BEFORE UPPER-SIDE BUBBLING) | ○ | | | ○ | | | |
| | UPPER-SIDE BUBBLING | | | | ○ | | | ○ |
| | WATER DISCHARGING | | | | ○ | ○ | | |

FIG.23

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE BUBBLING | | | | ○ | | ○ | |
| | WATER DISCHARGING | | | | ○ | ○ | | |
| | WATER FILLING (BEFORE UPPER-SIDE BUBBLING) | ○ | | | ○ | | | |
| | UPPER-SIDE BUBBLING (GAS-LIQUID CLEANING STEP) | ○ | | | ○ | | | ○ |
| | WATER DISCHARGING | | | | ○ | ○ | | |

FIG.24

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE BUBBLING | | | | ○ | | ○ | |
| | WATER DISCHARGING | | | | ○ | ○ | | |
| | WATER FILLING (BEFORE UPPER-SIDE BUBBLING) | ○ | | | ○ | | | |
| | UPPER-SIDE BUBBLING | | | | ○ | | | ○ |
| | WATER DISCHARGING | | | | ○ | ○ | | |
| | SHOWER CLEANING | ○ | | | | ○ | | |

FIG.25

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE INTERMITTENT BUBBLING (ON) | | | | ○ | | ○ | |
| | LOWER-SIDE INTERMITTENT BUBBLING (OFF) | | | | ○ | | | |
| | WATER DISCHARGING | | | | ○ | ○ | | |
| | WATER FILLING (BEFORE UPPER-SIDE BUBBLING) | ○ | | | ○ | | | |
| | UPPER-SIDE INTERMITTENT BUBBLING (ON) | | | | ○ | | | ○ |
| | UPPER-SIDE INTERMITTENT BUBBLING (OFF) | | | | ○ | | | |
| | WATER DISCHARGING | | | | ○ | ○ | | |

FIG.26

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE INTERMITTENT BUBBLING (ON) | | | | ○ | | ○ | |
| | LOWER-SIDE INTERMITTENT BUBBLING (OFF) | | | | ○ | | | |
| | UPPER-SIDE INTERMITTENT BUBBLING (ON) | | | | ○ | | | ○ |
| | UPPER-SIDE INTERMITTENT BUBBLING (OFF) | | | | ○ | | | |
| | WATER DISCHARGING | | | | ○ | ○ | | |

FIG.27

| | | VALVE NO. | | | | | | |
|---|---|---|---|---|---|---|---|---|
| | | 22 | 34 | 71 | 62 | 42 | 35 | 36 |
| STEP | WATER FILLING (BEFORE FILTERING) | ○ | | | ○ | | | |
| | FILTERING | ○ | | ○ | | | | |
| | BACKWASH | | ○ | | | ○ | | |
| | WATER FILLING (BEFORE LOWER-SIDE BUBBLING) | ○ | | | ○ | | | |
| | LOWER-SIDE INTERMITTENT BUBBLING (ON) | | | | ○ | | ○ | |
| | LOWER-SIDE INTERMITTENT BUBBLING (OFF) | | | | ○ | | | |
| | WATER DISCHARGING | | | | ○ | ○ | | |
| | WATER FILLING (BEFORE UPPER-SIDE BUBBLING) | ○ | | | ○ | | | |
| | UPPER-SIDE BUBBLING | | | | ○ | | | ○ |
| | WATER DISCHARGING | | | | ○ | ○ | | |

HOLLOW FIBER MEMBRANE MODULE AND METHOD OF CLEANING SAME

TECHNICAL FIELD

The present invention relates to a hollow fiber membrane module and a method of cleaning the same.

BACKGROUND ART

Conventional water treatment for removing underwater impurities uses a hollow fiber membrane module having a plurality of bundled hollow fiber membranes. In a filtering step of water treatment, raw water (water before being filtered) is supplied into the module through a raw water entrance provided in a hollow fiber membrane module, and filtered water having passed through the membrane is discharged to the outside of the module through a filtered water exit provided in the module.

In a hollow fiber membrane module, when a filtering step of water treatment is conducted, substances removed from water (SS: Suspended Solids) deposit on a surface of a membrane. Thus efficiently removing suspended solids deposited on a surface of a membrane is one of crucial problems.

In general, removal of suspended solids is conducted by so-called backwash (back-pressure wash). In a backwash step, for causing suspended solids attached to a membrane surface to rise from the membrane, a flow of fluid in a direction opposite to that in the filtering step is formed in a module. In other words, fluid such as gas or liquid is supplied into the module through the filtered water exit, and the fluid having passed through the membrane is discharged to the outside of the module through the raw water entrance.

Thus, suspended solids partially floating on the membrane surface as a result of execution of the backwash step are then subjected to a bubbling step to fall off from the membrane surface. In this bubbling step, air is supplied, with water filled in the module, and bubbles of the supplied air shake the membrane, so that the suspended solids on the membrane surface fall off. Patent Literatures 1 and 2 set forth below disclose hollow fiber membrane modules having a configuration for dispersing air in a module in a bubbling step.

In the hollow fiber membrane module in Patent Literature 1 set forth below, an air supply header and an air disperser are provided below a lower end of a hollow fiber membrane, so that an air supplied from the air supply header is dispersedly introduced by the air disperser. In Patent Literature 2 set forth below, micropores are formed on a side surface in a lower part of a pipe arranged at the center of a hollow fiber membrane bundle, and an air is supplied into the housing through the micropores.

In Patent Literature 1 set forth below, the air supply header and the air disperser are provided below the lower end of the hollow fiber membrane, and an air is dispersed by the air disperser on the lower end side of a hollow fiber membrane. In this case, although bubbling is conducted by the gas rising from the lower end of the hollow fiber membrane, while suspended solids attached to the membrane surface can be removed at the lower end, removal is not sufficiently conducted on the upper end.

Additionally, Patent Literature 2 set forth below discloses a structure in which bubbling gas is supplied from the micropores positioned in the vicinity of the lower end of the hollow fiber membrane. Therefore, similarly to Patent Literature 1 set forth below, while at the lower end of the hollow fiber membrane, suspended solids can be removed, at the upper end, the same cannot be satisfactorily removed. Accordingly, in a conventional hollow fiber membrane module, it is difficult to clean a membrane surface over the entire of the hollow fiber membrane in a bubbling step.

CITATION LIST

Patent Literature

Patent Literature 1: Japanese Patent Unexamined Publication No. H11-33367
Patent Literature 2: Japanese Patent Unexamined Publication No. H7-136469

SUMMARY OF INVENTION

An object of the present invention is to provide a hollow fiber membrane module which enables an entire hollow fiber membrane to be cleaned in a bubbling step and a method of cleaning the same.

A hollow fiber membrane module according to one aspect of the present invention is an external pressure filtering type hollow fiber membrane module. The hollow fiber membrane module comprises a hollow fiber membrane bundle having a plurality of bundled hollow fiber membranes, a housing with an internal space formed in which the hollow fiber membrane bundle is housed and a gas supply portion which disperses cleaning gas for the hollow fiber membranes in the internal space. The internal space has an upper space in which an upper-side part of the hollow fiber membrane above a center of the hollow fiber membrane in a longitudinal direction is positioned and a lower space in which a lower-side part of the hollow fiber membrane below the center of the hollow fiber membrane in the longitudinal direction is positioned. The gas supply portion is provided with an upper-side gas supply portion which disperses gas in the housing at a position of the upper space and a lower-side gas supply portion which disperses gas in the housing at a position below the lower space.

A cleaning method of a hollow fiber membrane module according to an another aspect of the present invention is the method in which a hollow fiber membrane is cleaned by dispersing gas in an internal space of a housing filled with water. The hollow fiber membrane module is external pressure filtering type, and is configured such that a hollow fiber membrane bundle having a plurality of bundled hollow fiber membranes is housed in the internal space of the housing. The internal space has an upper space in which an upper-side part of the hollow fiber membrane above a center of the hollow fiber membrane in a longitudinal direction is positioned and a lower space in which a lower-side part of the hollow fiber membrane below the center of the hollow fiber membrane in the longitudinal direction is positioned. The cleaning method of the hollow fiber membrane module comprises a lower-side bubbling step of dispersing gas in the housing at a position below the lower space to clean the hollow fiber membrane and an upper-side bubbling step of dispersing gas in the housing at a position of the upper space after the lower-side bubbling step to clean the hollow fiber membrane.

BRIEF DESCRIPTION OF DRAWINGS

FIG. 7 is a diagram showing a basic operation program of the filtering device.

FIG. 17 is a diagram showing an operation program of a filtering device in a cleaning method of a hollow fiber membrane module of a seventh embodiment of the present invention.

FIG. 22 is a view showing an operation program of a filtering device in a modification of the seventh embodiment of the present invention.

FIG. 23 is a view showing an operation program of a filtering device in a cleaning method of a hollow fiber membrane module of an eighth embodiment of the present invention.

FIG. 24 is a view showing an operation program of a filtering device in a cleaning method of a hollow fiber membrane module of a ninth embodiment of the present invention.

FIG. 25 is a view showing an operation program of a filtering device in a cleaning method of a hollow fiber membrane module of a tenth embodiment of the present invention.

FIG. 26 is a view showing an operation program of a filtering device in a modification of the tenth embodiment of the present invention.

FIG. 27 is a view showing an operation program of a filtering device in a modification of the tenth embodiment of the present invention.

DESCRIPTION OF EMBODIMENTS

In the following, embodiments of the present invention will be described in detail with reference to the drawings.

First Embodiment

[Filtering Device, Hollow Fiber Membrane Module]

Figure 1:
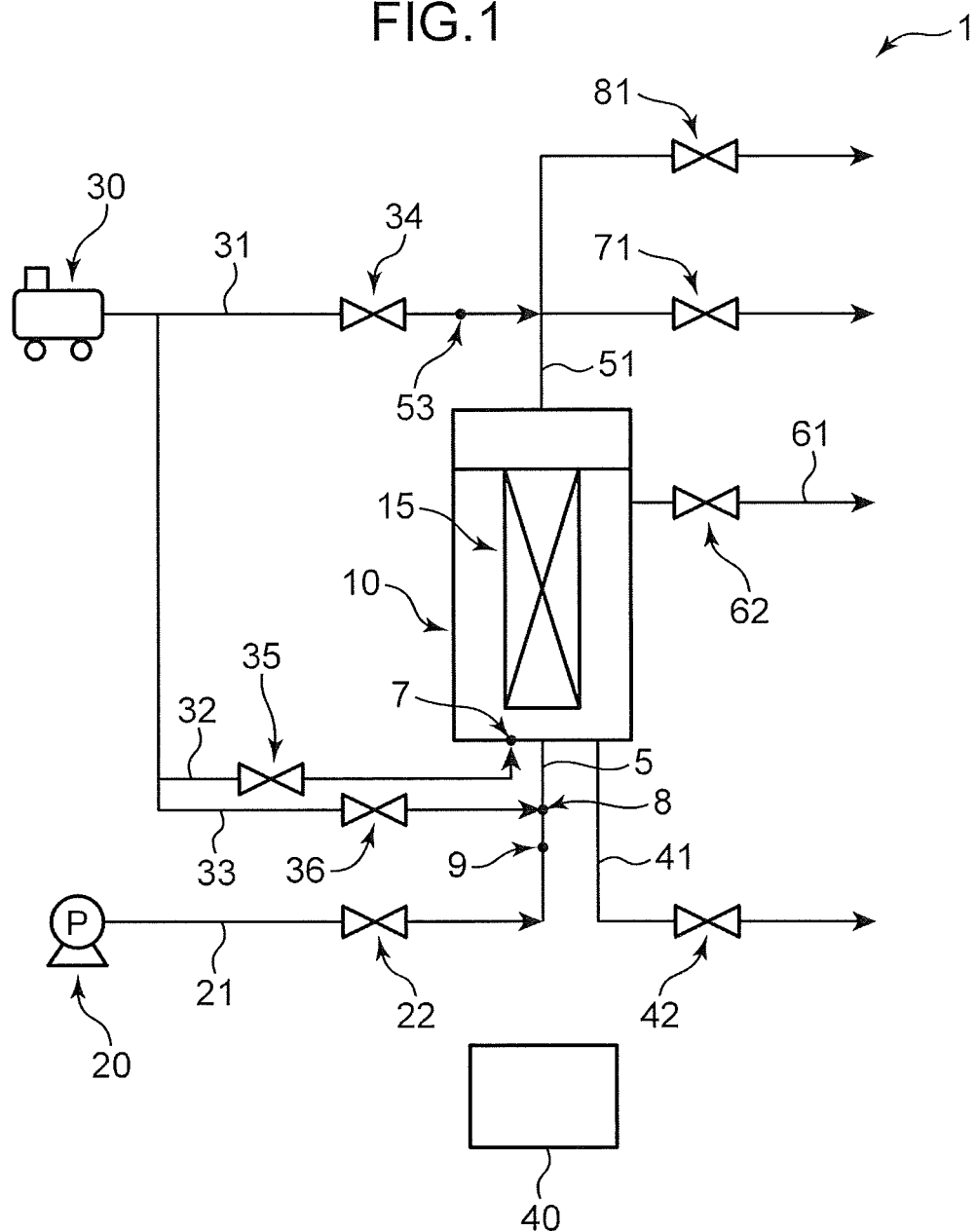
FIG. 1 is a schematic diagram showing a configuration of a filtering device in a first embodiment of the present invention.
Figure 2:
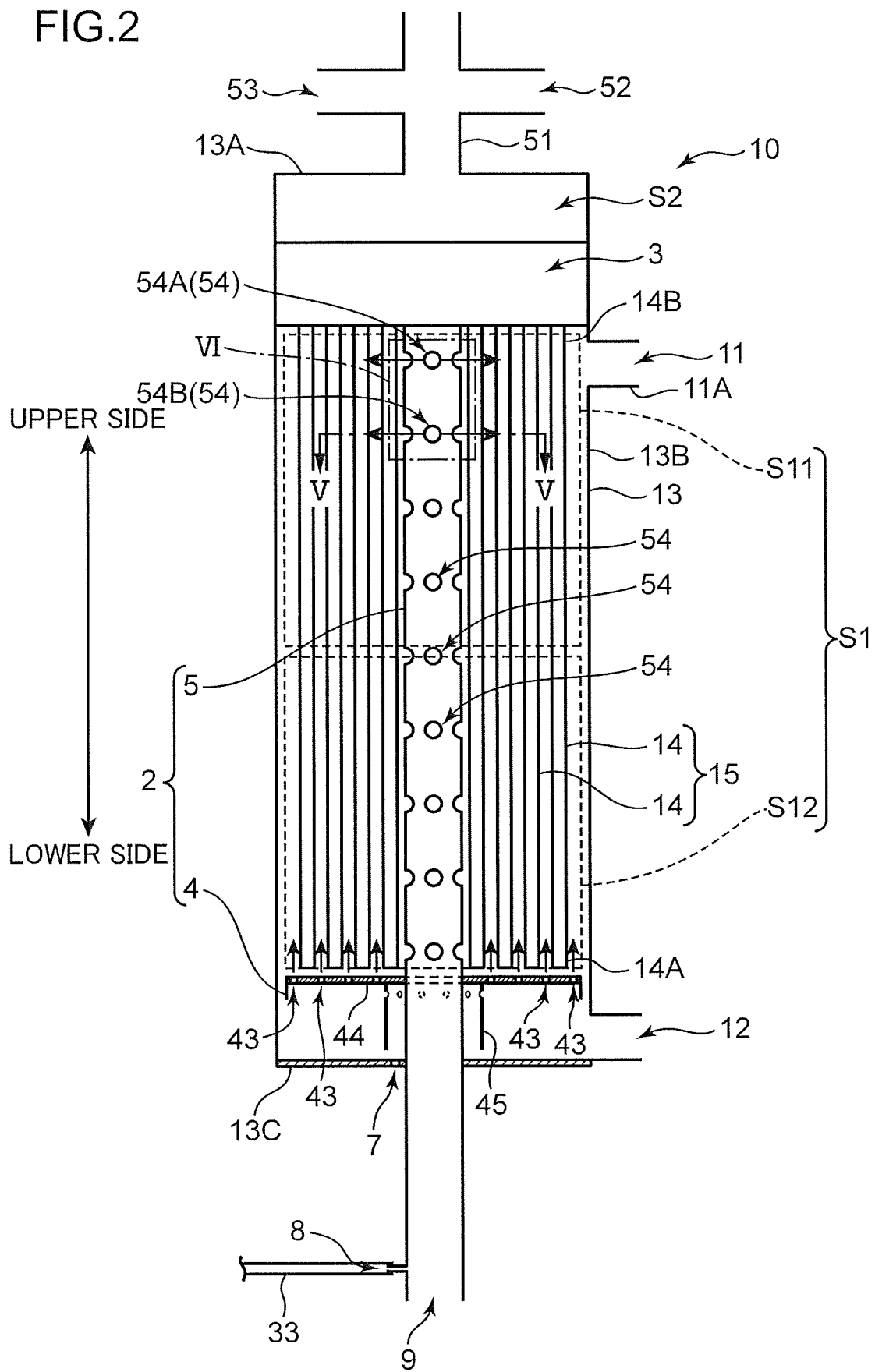
FIG. 2 is a view showing a configuration of a hollow fiber membrane module in the first embodiment of the present invention.

First, description will be made of a configuration of a filtering device 1 provided with a hollow fiber membrane module 10 according to a first embodiment of the present invention with reference to FIG. 1 and FIG. 2. FIG. 1 is a schematic diagram showing a configuration of the filtering device 1. FIG. 2 is a schematic view showing a configuration of the hollow fiber membrane module 10.

The filtering device 1 is an external pressure filtering type device which supplies raw water to an outer surface side of a hollow fiber membrane to extract a filtrate from an inner surface side. The filtering device 1 has the hollow fiber membrane module 10 of an external pressure filtering type, a liquid supply pump 20, an air compressor 30, piping which connects these portions and an opening and closing valve provided in the piping, and a control device 40.

As shown in FIG. 2, the hollow fiber membrane module 10 has a hollow fiber membrane bundle 15 in which a plurality of hollow fiber membrane 14 are fixed in bundled state by a fixing member 3 at an upper end 14B, a housing 13 in which an internal space S1 for housing the hollow fiber membrane bundle 15 is formed, a conduit (pipe member) 5 for introducing raw water into the housing 13 and a gas diffusing member 4 for dispersing gas supplied into the housing 13.

The hollow fiber membrane bundle 15 is one-end-free type in which the upper end 14B of the plurality of the hollow fiber membranes 14 is fixed by the fixing member 3 in open state and a lower end 14A is sealed so as not to be fixed one by one. The fixing member 3 bundles and fixes the upper end 14B of the plurality of the hollow fiber membranes 14. For making the hollow fiber membranes 14 function as a filtering membrane, the fixing member 3 liquid-tightly sections space in the housing 13 into the raw water side internal space S1 and a filtrate side space S2. For the fixing member 3, thermosetting resins such as epoxy resin, unsaturated polyester resin and polyurethane resin are used. Method for bonding the hollow fiber membrane bundle 15 and the fixing member 3 includes a centrifugal bonding method, a static bonding method and the like.

As a material of the hollow fiber membrane 14, various materials can be used and the material is not particularly limited. The material preferably includes at least one kind selected from the group consisting of, for example, polyethylene, polypropylene, polyacrylonitrile, ethylene-tetrafluoroethylene copolymer, polychloro-trifluoroethylene, polytetrafluoroethylene, polyvinyl fluoride, tetrafluoroethylene-hexafluoropropylene copolymer, tetrafluoroethylene-perfluoroalkylvinylether copolymer, chlorotrifluoroethylene-ethylene copolymer, polyvinylidene fluoride, polysulfone, acetylcellulose, polyvinyl alcohol, and polyether sulfone, and is more preferably polyvinylidene fluoride (PVDF) in view of strength of a membrane, chemical resistance and the like.

The hollow fiber membrane 14 are preferably hydrophilic. The hollow fiber membrane 14 contains 0.1 weight % or more and 10 weight % or less of hydrophilic resin to have hydrophilicity. As a hydrophilic resin, although such resins as polyvinyl pyrolidone, cellulose ester, ethylene-vinyl alcohol, polyvinyl alcohol and the like can be used, and polyvinyl alcohol is particularly preferable in view of high hydrophilicity.

The hollow fiber membrane 14 are preferably acetalized to be insoluble in high-temperature water. Being acetalized prevents a hydrophilic resin from being excessively eluted at the time of extraction processing and in actual use. Acetalization can be realized by processing the hollow fiber membrane 14 in an acid aqueous solution containing an aldehyde compound. Usable aldehyde includes formaldehyde, glyoxal, glutaraldehyde, malondialdehyde, nonanedial and the like. Preferable acid is strong acid such as sulfuric acid, hydrochloric acid, nitric acid and the like.

The hollow fiber membrane 14 is preferably a vinylidene fluoride-based resin porous hollow fiber membrane with a pure water permeation speed which satisfies a formula set forth below.

$$(FLUXd/FLUXw) \times 100 \geq 40.0$$

In the above formula, "FLUXd" represents a pure water permeation speed ($L/m^2/hr/98$ kPa) of a dry hollow fiber membrane, and "FLUXw" represents a pure water permeation speed ($L/m^2/hr/98$ kPa) of a wet hollow fiber membrane.

In the hollow fiber membrane module 10, pressure cleaning using air is conducted from a secondary side. Here, when the pure water permeation speed of the hollow fiber membrane 14 fails to satisfy the range of the above formula, the membrane dries to have lowered SS dischargeability in some cases. In other words, when (FLUXd/FLUXw)×100 is smaller than 40, the hollow fiber membrane 14 will be dried while being repeatedly used. Then, no water will permeate through a dried part of the membrane, so that the filtering function will be lost, while load to a membrane part having the filtering function will be increased, so that dischargeability is liable to be reduced.

The hollow fiber membrane 14 preferably has a water permeability of 1000 to 40000 $L/m^2/h$ at an inter-membrane differential pressure of 0.1 MPa, more preferably 1000 to 30000 $L/m^2/h$, and further preferably 1000 to 20000 $L/m^2/h$. With too low water permeability, permeation performance is liable to deteriorate. On the other hand, when water permeability is too high, fractionation properties are liable to deteriorate. Thus, by setting a water permeability to be within the above range, the hollow fiber membrane 14 with more excellent permeation performance and fractionation properties can be obtained.

Water permeability of the hollow fiber membrane 14 can be measured by the following manner. First, the hollow fiber membrane module 10 is produced by bundling 20 hollow fiber membranes 14 with an effective membrane length of 20 cm. At this time, the hollow upper end 14B penetrates through the fixing member 3, while a hollow part of the lower end 14A is sealed with an epoxy resin. Using the hollow fiber membrane module 10, pure water is filtered from the side of an outer circumference surface of the hollow fiber membrane 14 to obtain filtered water from the side of an inner circumference surface of the upper end 14B. At this time, the inter-membrane differential pressure is adjusted to be 0.1 MPa, so that then obtained permeation performance can be measured as a water permeability of the hollow fiber membrane 14 at an inter-membrane differential pressure of 0.1 MPa.

The hollow fiber membrane module 10 is designed for an external pressure filtering system but may be an external pressure dead-end filtering system or an external pressure circulation filtering system according to conditions for membrane separation processing or required performance. In view of membrane life, an external pressure circulation filtering system is preferable which is capable of simultaneously conducting filtering membrane surface cleaning, and in view of simple facilities, installation costs and operation costs, external pressure dead-end filtering system is preferable.

Although in the hollow fiber membrane bundle 15, as the number of the hollow fiber membrane 14 is increased, a membrane area per module is increased to enable operation at an increased filtering flow rate, while discharging efficiency of suspended solids is lowered during cleaning. Therefore, a membrane filling rate 100 $\pi n di^2/4S$ (%) calculated using an outer diameter di (m) of the hollow fiber membrane 14, the number n of the hollow fiber membrane 14 and a cross sectional area S ($m^2$) of the housing 13 is preferably 10 to 60%, and more preferably 20 to 50%.

The housing 13 has a cylindrical shape with an upper face 13A and a lower face 13C, and a side face 13B connecting these faces. The housing 13 has the internal space S1 in which the hollow fiber membrane bundle 15 is housed. The internal space S1 is divided into an upper space S11 in which an upper-side part of the hollow fiber membrane 14 above a center of the hollow fiber membrane 14 in a longitudinal direction is positioned and a lower space S12 in which a lower-side part of the hollow fiber membrane 14 below the center of the hollow fiber membrane 14 in the longitudinal direction is positioned.

To the upper face 13A of the housing 13, a filtrate piping 51 for extracting a filtrate is connected, and the filtrate piping 51 is provided with a filtrate exit 52 and a filtrate side gas entrance 53. On the side face 13B, immediately under the fixing member 3, a gas extraction port 11 for discharging gas in the internal space S1 to the outside of the system is provided. The gas extraction port 11 is an opening portion of the upper space S11. On the side face 13B, immediately above the lower face 13C, a drain extraction port 12 for discharging liquid in the internal space S1 to the outside of the system is provided. In the vicinity of the center of the lower face 13C, a diffusing gas entrance 7 for supplying gas into the internal space S1 is provided.

To the gas extraction port 11, a gas extraction piping 61 is connected, through which gas in the housing 13 is discharged to the outside of the system. In the gas extraction piping 61, a gas outlet valve 62 is provided, opening of which leads to extraction of gas from the housing 13. Additionally, to the drain extraction port 12, a drain piping 41 is connected, through which liquid in the housing 13 is discharged. In the drain piping 41, a raw water outlet valve 42 is provided, opening of which leads to discharge of liquid from the housing 13.

Usable materials of the housing 13 include SUS, modified PPE, polyvinyl chloride, polysulfone, polycarbonate, polyolefin, ABS resin and the like. A so-called integral module may be configured by fixing the fixing member 3 to an inner face of the housing 13 by bonding. Additionally, to an outer circumference portion of the fixing member 3, an O-ring, a packing or the like may be attached so that the fixing member 3 is detachably and liquid-tightly mounted on the housing 13. In this case, the housing 13 can be repeatedly used by detaching the fixing member 3 to replace the hollow fiber membrane bundle 15.

The conduit 5 is arranged to pass through the center of the lower face 13C of the housing 13 and extends toward the upper face 13A, with an upper end thereof connected to the fixing member 3. The conduit 5 has a lower end side provided with a raw water entrance 9 and a side surface provided with a conduit gas entrance 8. The conduit 5 enables supply of only raw water before being filtered into the housing 13, the raw water being introduced from the raw water entrance 9, also enables supply only the gas into the housing 13, the gas being introduced from the conduit gas entrance 8, and also enables supply of both raw water and gas into the housing 13.

The gas diffusing member 4 is a member for dispersing gas supplied from the diffusing gas entrance 7 into the housing 13 so as to be spread in a radial direction of the hollow fiber membrane bundle 15. The gas diffusing member 4 is arranged at a position below the lower space S12 and has a central part through which the conduit 5 passes. Detailed structure of the conduit 5 and the diffusing member 4 will be described later.

The liquid supply pump 20 is connected to the raw water entrance 9 of the conduit 5 via a raw water introduction piping 21. The raw water introduction piping 21 is provided with a raw water introduction valve 22 which switches circulation and cut-off of a raw water in the piping. The liquid supply pump 20 supplies raw water into the conduit 5 via the raw water introduction piping 21.

The air compressor 30 is connected to the filtrate side gas entrance 53 via a first gas introduction piping 31, is connected to the diffusing gas entrance 7 via a second gas introduction piping 32 and is connected to the conduit gas entrance 8 via a third gas introduction piping 33. The first gas introduction piping 31 is provided with a first gas introduction valve 34 which switches circulation and cut-off of gas in the piping, and the second and third gas introduction pipings 32 and 33 are similarly provided with second and third gas introduction valves 35 and 36. Thus, in the present embodiment, the third gas introduction piping 33 and the third gas introduction valve 36 as a gas supplying mean for the conduit 5, and the second gas introduction piping 32 and the second gas introduction valve 35 as a gas supplying mean for the gas diffusing member 4 are separately provided.

The control device 40 controls driving of the liquid supply pump 20 and the air compressor 30 and controls switching operation of each valve. The control device 40 is configured, for example, with a personal computer or the like. The control device 40 has a storage portion in which sequence information of steps (filling water, filtering, backwash, bubbling, discharging water, etc.) sequentially executed in a filtering process is stored and a control portion which controls driving of each device and switching of the valve according to the sequence information.

[Gas Diffusing Member, Conduit]

Figure 3:
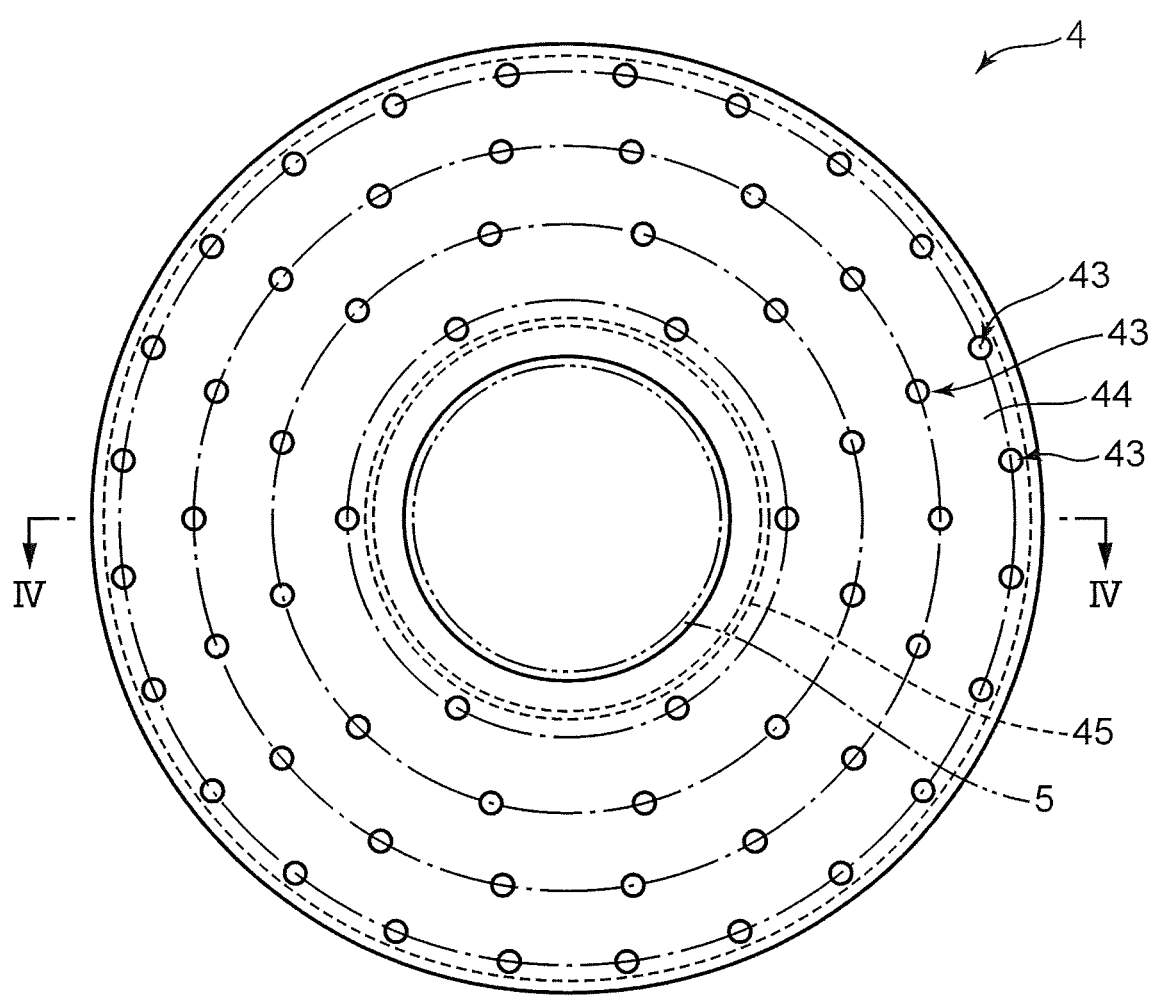
FIG. 3 is a view showing a planer structure of a gas diffusing member provided in the hollow fiber membrane module.
Figure 4:
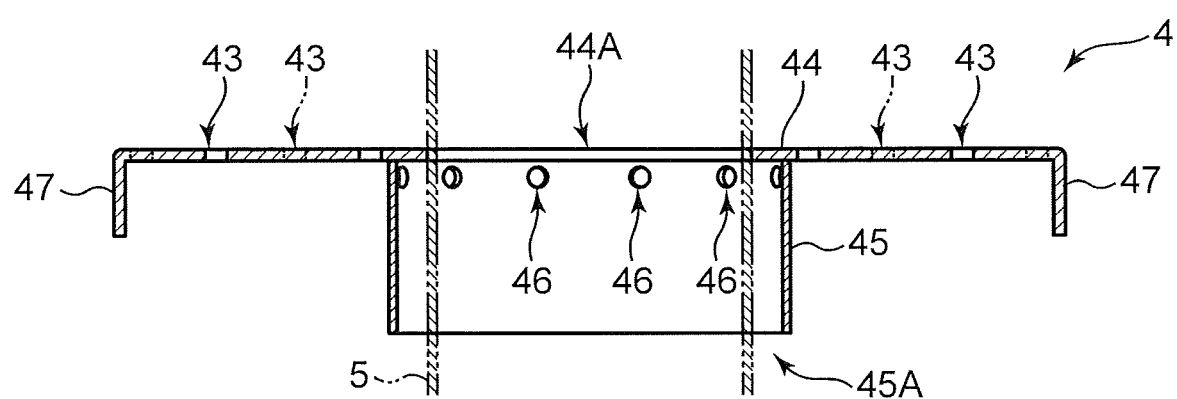
FIG. 4 is a view showing a cross sectional structure of the gas diffusing member along a line segment IV-IV in FIG. 3.
Figure 5:
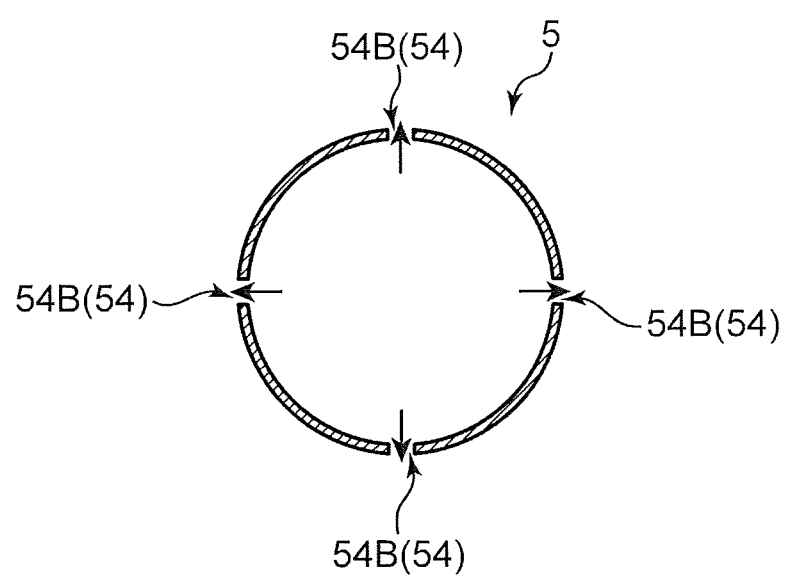
FIG. 5 is a view showing a cross sectional structure of a conduit along a line segment V-V in FIG. 2.

Next, detailed structures of the gas diffusing member 4 and the conduit 5 will be described with reference to FIG. 2 to FIG. 5. FIG. 3 shows a planer structure of the gas diffusing member 4. FIG. 4 shows a cross sectional structure of the gas diffusing member 4 along a line segment IV-IV in FIG. 3. FIG. 5 shows a cross sectional structure of the conduit 5 along a line segment V-V in FIG. 2. The hollow fiber membrane module 10 has a gas supply portion 2 which disperses gas (e.g. air) for cleaning the hollow fiber membrane 14 in the internal space S1 of the housing 13, and the gas supply portion 2 has the gas diffusing member 4 and the conduit 5.

The gas diffusing member 4 is arranged below the lower end 14A of the hollow fiber membrane 14. The gas diffusing member 4 has a shape extending in the radial direction of the hollow fiber membrane bundle 15. The peripheral edge of the gas diffusing member 4 is positioned at an outer side than the hollow fiber membrane bundle 15 in the radial direction. In the gas diffusing member 4, a plurality of diffusing vent holes 43 for dispersing gas in the housing 13 are formed at intervals in the radial direction.

The gas diffusing member 4 has a disc-shaped main body portion 44 which has a shape extending in the radial direction of the hollow fiber membrane bundle 15 and in which the plurality of diffusing vent holes 43 are formed, a peripheral wall portion 47 connected to a peripheral edge of the main body portion 44 and a cylindrical gas receiving portion 45 connected to a back face of the main body portion 44. These portions are integrally formed.

The diffusing vent holes 43 are formed so as to penetrate the main body portion 44 in a thickness direction. The diffusing vent holes 43 are formed at intervals in a radial direction and a circumferential direction of the main body portion 44, and some of the diffusing vent holes 43 are positioned radially outside with respect to the hollow fiber membrane bundle 15. This enables gas to be dispersed in a wide range of the hollow fiber membrane bundle 15 in the radial direction. Additionally, at the center of the main body portion 44, a through hole 44A is formed through which the conduit 5 penetrates. The shape of the main body portion 44 is not limited to such a disc-shaped as shown in FIG. 3, but may be any of various shapes.

The gas receiving portion 45 is a part for temporarily housing gas supplied from the diffusing gas entrance 7 into the housing 13. The gas receiving portion 45 has a tube shape, and has an upper end (one end) connected to the back face of the main body portion 44. In addition, a gas reception port 45A is formed at a lower end (the other end) side of the gas receiving portion 45. In the present embodiment, the gas receiving portion 45 has an inner diameter generally constant from the upper end toward the lower end. The gas receiving portion 45 has the inner diameter larger than an outer diameter of the conduit 5. The gas receiving portion 45 houses gas in a gap between an inner circumference surface of the gas receiving portion 45 and an outer circumference surface of the conduit 5.

The gas receiving portion 45 is positioned radially outside with respect to the diffusing gas entrance 7. This enables gas supplied from the diffusing gas entrance 7 into the housing 13 to be housed in the tube. Additionally, as shown in FIG. 2, a gap is formed between the lower end of the gas receiving portion 45 and a lower wall of the housing 13, and with this gap, liquid in the housing 13 is allowed to circulate. This prevents liquid pool in a bottom part of the housing 13.

In a part on the upper end side of the gas receiving portion 45, a plurality of dispersion holes 46 are formed at intervals in a circumferential direction. The dispersion holes 46 are formed to penetrate the gas receiving portion 45. The dispersion holes 46 escape gas housed in the gas receiving portion 45 to radially outside with respect to the gas receiving portion 45, thereby guiding the gas to the diffusing vent holes 43. The dispersion holes 46 may be formed at equal intervals in a circumferential direction or at different intervals.

The peripheral wall portion 47 has a cylindrical shape extending downward from the peripheral edge of the main body portion 44. The peripheral wall portion 47 suppresses gas released from the dispersion holes 46 to the outside of the gas receiving portion 45 from spreading outside the main body portion 44. This enables gas to stay on the back face of the main body portion 44 before gas is dispersed from the diffusing vent holes 43.

In the gas diffusing member 4, after the gas receiving portion 45 temporarily houses gas supplied from the diffusing gas entrance 7 into the housing 13 in a bubbling step, gas can be escaped from the dispersion holes 46 to the outside and then dispersed from the diffusing vent holes 43 to the lower space S12. In other words, in the present embodiment, the diffusing vent holes 43 function as a lower-side gas supply portion which disperses gas in the housing 13 at a position below the lower space S12.

The conduit 5 is arranged to extend in an up-down direction at the center of the hollow fiber membrane bundle 15. The conduit 5 has a cylindrical shape, but the shape is not particularly limited. As shown in FIG. 2, the conduit 5 penetrates the gas diffusing member 4 (the main body portion 44) and has the lower end fixed to the raw water introduction piping 21 (FIG. 1) via an arbitrary sealing member (not shown). Additionally, a method of fixing the conduit 5 is not limited thereto, but an another piping may be provided so as to protrude more upwardly than the top face of the main body portion 44 and the conduit 5 may be mounted on the top face of the main body portion 44 such that the protruding part is located inside the conduit 5.

In the conduit 5, in a part protruding more upwardly than the top face of the main body portion 44, a plurality of pipe vent holes 54 is formed at intervals over the entire longitudinal direction. More specifically, in the conduit 5, at a part positioned in the upper space S11, the plurality of pipe vent holes 54 is formed at intervals, and also at a part positioned in the lower space S12, the plurality of pipe vent holes 54 is formed at intervals from each other. These pipe vent holes 54 enable supply of gas for bubbling into the housing 13 and also enable supply of raw water to be filtered by the hollow fiber membrane 14 into the housing 13. The pipe vent holes 54 may be formed at equal intervals in the longitudinal direction or may be formed at different intervals. Additionally, although the pipe vent holes 54 have a circular shape, the shape is not particularly limited.

The plurality of pipe vent holes 54 is each formed to have the same size in a longitudinal direction of the conduit 5. An inner diameter of the pipe vent holes 54 is preferably designed to be 30 mm or less in order to enhance a bubbling effect. Additionally, the inner diameter of the pipe vent holes 54 is preferably designed to have a total speed of discharging flow of raw water from each hole of 4 m/s or less in order to reduce a pressure loss during permeation and more preferably designed to have the total speed of 3 m/s or less.

As shown in FIG. 2, a pipe vent hole 54A formed in an uppermost part of the conduit 5 is positioned above a lower face 11A of the gas extraction port 11 and a second pipe vent hole 54B from the top is positioned below the lower face 11A. In other words, in the conduit 5, the pipe vent holes 54A and 54B are formed at a position sandwiching the lower face 11A of the gas extraction port 11 in the up-down direction.

As shown in FIG. 5, the four pipe vent holes 54 are formed at equal intervals in a circumferential direction of the conduit 5. Although in the present embodiment, in either a part positioned in the upper space S11 or a part positioned in the lower space S12, the four pipe vent holes 54 are formed at an interval of 90°, the number of the pipe vent holes 54 and an interval in the circumferential direction are not particularly limited. Additionally, as in other embodiment to be described later, the number of the pipe vent holes 54 or an interval in the circumferential direction may differ in a part positioned in the upper space S11 and in a part positioned in the lower space S12.

Figure 6:
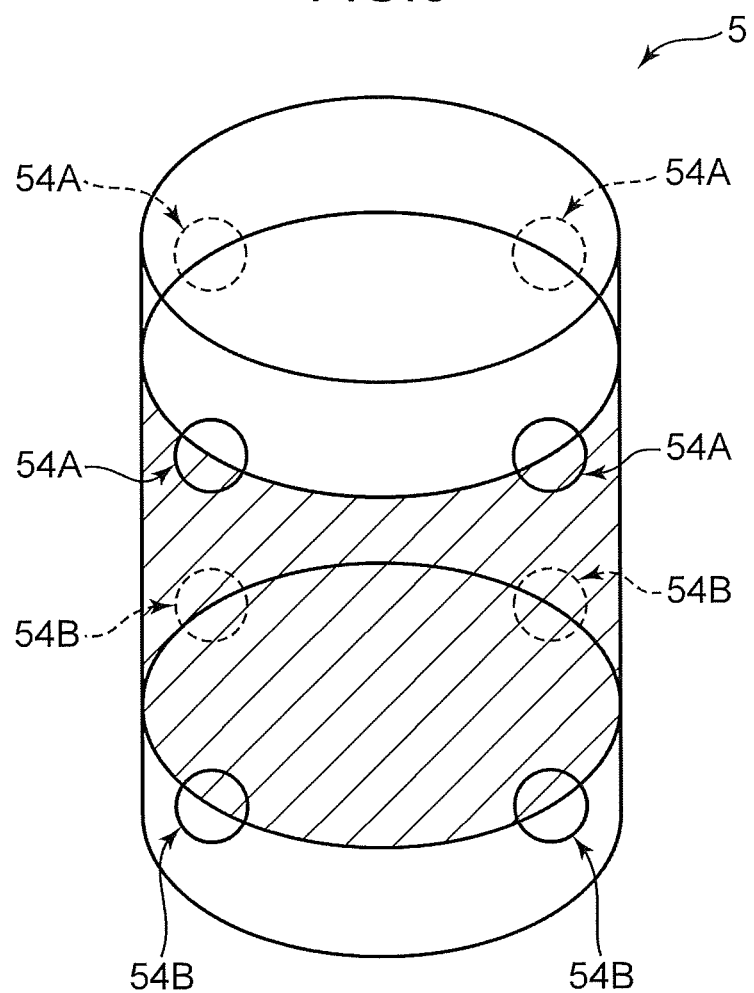
FIG. 6 is an enlarged view of the conduit in a region VI in FIG. 2.

FIG. 6 is an enlarged view of the conduit 5 in a region VI in FIG. 2. A hole ratio of the pipe vent holes 54 in the conduit 5 can be defined as follows. As shown in a slant line part of FIG. 6, when an area of the outer circumference surface of the conduit 5 in a range from an intermediate height position of the uppermost part pipe vent hole 54A to an intermediate height position of the pipe vent hole 54B immediately below the uppermost part pipe vent hole 54A is set to be S1 and a total of opening areas of all the pipe vent holes 54A and 54B formed on the outer circumference surface in the range is set to be S2, a hole ratio of the pipe vent holes can be defined to be S2/S1×100. In the present embodiment, the hole ratio is preferably designed to be 1% or more and 20% or less.

The conduit 5 enables supply of raw water from the pipe vent holes 54 into the housing 13, as well as enabling gas introduced from the conduit gas entrance 8 to rise due to buoyancy, thereby dispersing the gas from the pipe vent holes 54A and 54B positioned in the upper space S11 into the housing 13. In other words, in the present embodiment, the pipe vent holes 54A and 54B function as an upper-side gas supply portion which disperses gas into the housing 13 at the position of the upper space S11.

A length of the conduit 5 inserted into the housing 13 is preferably 1 to 2 times a length of the hollow fiber membrane 14 and more preferably 1 to 1.5 times in order not to make the hollow fiber membrane module 10 be bulky.

An inner diameter of the conduit 5 is preferably designed such that a flow speed during permeation is 4 m/s or less, and more preferably is 3 m/s or less in order to reduce a pressure loss during permeation.

[Cleaning Method of Hollow Fiber Membrane Module]

Next, description will be made of filtering operation by the filtering device 1 and cleaning method of a hollow fiber membrane module according to the present embodiment, the method being executed during the operation, with reference to FIG. 7. FIG. 7 shows, regarding a basic operation method of the filtering device 1 shown in FIG. 1, a relationship between each step and a switching state of a valve. In FIG. 7, a circle represents that the valve is open.

First, a water filling step (before filtering) is executed. In this step, with all the valves of the filtering device 1 closed, the raw water introduction valve 22 and the gas outlet valve 62 are opened by the control device 40, so that the liquid supply pump 20 operates. As a result, raw water is introduced from the liquid supply pump 20 into the conduit 5 via the raw water introduction piping 21 to supply raw water from the pipe vent holes 54 into the housing 13. As a result, the internal space S1 of the housing 13 is filled with water.

Next, the filtering step is executed. In this step, after raw water overflows from the gas extraction port 11, a filtrate exit valve 71 is opened and the gas outlet valve 62 is closed by the control device 40. Then, the raw water filled in the internal space S1 passes from an outer surface side of the hollow fiber membrane 14 through a wall surface to penetrate to an inner surface side so as to be taken out from the space S2 on the filtrate side as a filtrate.

With the lapse of filtering time, suspended solids in raw water attach to the outer surface of the hollow fiber membrane 14, resulting in lowering a filtering capacity. Therefore, after execution of filtering for a fixed time, the membrane surface of the hollow fiber membrane 14 is cleaned by executing the cleaning method of the hollow fiber membrane module according to the present embodiment to be described in the following.

First, a backwash step is executed. In this step, the raw water outlet valve 42 and the first gas introduction valve 34 are opened by the control device 40 to operate the air compressor 30. This leads to introduction of gas (e.g., air) into the space S2 on the filtrate side of the housing 13 from the filtrate side gas entrance 53, and the gas pressurizes a filtrate. The filtrate is pushed out from the inner surface side of the hollow fiber membrane 14 to the outer surface of the fiber membrane 14, resulting in that a part of the liquid in the internal space S1 is discharged from the drain extraction port 12 to the outside of the system. Backwash of the hollow fiber membrane 14 is thus conducted. Thereafter, by opening a filtrate side pressure release valve 81, pressure on the filtrate side of the space S2 is lowered.

Next, a water filling step (before lower-side bubbling) is executed. In this step, in order to raise a liquid surface lowered in the above backwash step in the internal space S1, the gas outlet valve 62 and the raw water introduction valve 22 are opened by the control device 40 to operate the liquid supply pump 20. As a result, the liquid is introduced into the internal space S1 to raise the liquid surface. Thereafter, the liquid supply pump 20 is stopped and the raw water introduction valve 22 is closed to stop supply of the liquid.

Next, a lower-side bubbling step is executed. In this step, in a state where the internal space S1 is filled with water, the second gas introduction valve 35 is opened by the control device 40 to operate the air compressor 30. As a result, gas is supplied from the diffusing gas entrance 7 into the housing 13 via the second gas introduction piping 32. Then, after being housed in the gas receiving portion 45, the gas is dispersed from the diffusing vent holes 43 to the lower space S12. Then, by the gas rising from the lower end 14A of the hollow fiber membrane 14 to the upper space S11, the hollow fiber membrane 14 are shaken, which causes suspended solids attached to the membrane surface to fall off. Thus, in the lower-side bubbling step, by dispersing gas at a position below the lower space S12 in the housing 13, and raising the gas to the upper space S11, the hollow fiber membrane 14 positioned in the lower space S12 and a lower-side part of the upper space S11 are cleaned.

Next, a water discharging step is executed. In this step, the second gas introduction valve 35 is closed, while the raw water outlet valve 42 is opened by the control device 40. As a result, the liquid containing the suspended solids having fallen off from the membrane surface in the lower-side bubbling step is discharged to the outside of the system via the drain extraction port 12.

Next, a water filling step (before upper-side bubbling) is executed. In this step, the gas outlet valve 62 and the raw water introduction valve 22 are opened to operate the liquid supply pump 20, thereby again filling the internal space S1 with liquid.

Next, the upper-side bubbling step is executed. This step is executed aiming at reliably removing the suspended solids attached to the membrane surface in the upper end 14B of the hollow fiber membrane 14 whose cleaning is insufficient in the lower-side bubbling step.

First, the raw water introduction valve 22 is closed, while the third gas introduction valve 36 is opened by the control device 40. As a result, gas is introduced from the conduit gas entrance 8 into the conduit 5 via the third gas introduction piping 33. Then, the gas is raised in the tube due to buoyancy so as to be dispersed from the pipe vent holes 54A and 54B positioned in the upper space S11 into the housing 13. This enables bubbling cleaning centered around the vicinity of the upper end 14B of the hollow fiber membrane 14, so that the suspended solids attached surrounding the upper end 14B of the hollow fiber membrane 14 are more reliably removed, the suspended solids being not satisfactorily removed in the lower-side bubbling step. Thus, by dispersing the gas in the housing 13 at the position of the upper space S11 in the upper-side bubbling step, the hollow fiber membranes 14 are cleaned.

In the upper-side bubbling step, immediately after the start of bubbling, the entire internal space S1 is filled with water, and thus gas discharged from the uppermost part pipe vent hole 54A and the pipe vent hole 54B immediately below the uppermost part pipe vent hole 54A enables bubbling cleaning. Then, after a lapse of fixed time after the start of bubbling, liquid containing gas is discharged from the gas extraction port 11, so that the liquid surface of the internal space S1 is lowered to the lower face 11A. Also in this state, it is possible to make water in the conduit 5 jet, together with gas, from the pipe vent hole 54A above the lower face 11A of the extraction port 11 by buoyancy of the gas supplied to the conduit 5 and make water in the housing 13 flow into the conduit 5 from the pipe vent hole 54B below the lower face 11A of the extraction port 11. As a result, mixed fluid of liquid and gas can be continuously jetted from the pipe vent hole 54A above the lower face 11A of the extraction port 11 for bubbling, so that effective cleaning up to the upper end 14B of the hollow fiber membrane 14 is possible.

Next, a water discharging step is executed. In this step, the third gas introduction valve 36 is closed, while the raw water outlet valve 42 is opened. As a result, the liquid containing the suspended solids having fallen off from the membrane surface in the upper-side bubbling step is discharged from the drain extraction port 12 to the outside of the system. After the hollow fiber membrane module 10 is cleaned in the foregoing manner, the filtering operation is restarted.

In either of the upper-side and lower-side bubbling steps, an amount of gas supply is preferably 20000 NL/h or less and is preferably within a range of 500 to 10000 NL/h. Additionally, while in the lower-side bubbling step, when an amount of gas supply is excessive, the hollow fiber membranes 14 are tangled with each other to damage the membrane surface, in the upper-side bubbling step, such a problem hardly occurs. It is therefore possible, in the upper-side bubbling step, to set an amount of gas supply to be higher than in the lower-side bubbling step.

[Function and Effect]

Next, features, functions and effects of the hollow fiber membrane module 10 and the method of cleaning the hollow fiber membrane module 10 according to the above present embodiment will be described.

The hollow fiber membrane module 10 is provided with the hollow fiber membrane bundle 15, the housing 13 with the internal space S1 formed in which the hollow fiber membrane bundle 15 is housed and the gas supply portion 2 which disperses gas for cleaning a hollow fiber membrane in the internal space S1. The gas supply portion 2 is provided with the pipe vent holes 54A and 54B, as an upper-side gas supply portion, which disperse gas in the housing 13 at a position of the upper space S11 and the diffusing vent holes 43, as a lower-side gas supply portion, which disperse gas in the housing 13 at the position below the lower space S12.

According to the hollow fiber membrane module 10, with the internal space S1 filled with water, by dispersing gas from the diffusing vent holes 43 so that the gas rises from the lower end 14A of the hollow fiber membrane 14 to shake the hollow fiber membrane 14, suspended solids attached to the membrane surface can be fallen off. Additionally, gas can be dispersed into the housing 13 not only from the diffusing vent holes 43 but also from the pipe vent holes 54A and 54B. Therefore, it is possible to spread gas up to the upper end 14B of the hollow fiber membrane 14 where gas hardly spreads when gas is dispersed from the diffusing vent holes 43. This increases an effect of removing suspended solids attached to the membrane surface on the upper end 14B. Accordingly, the hollow fiber membrane module 10 enables the entire hollow fiber membrane 14 to be cleaned in the bubbling step.

The gas supply portion 2 includes the gas diffusing member 4 which has a shape extending in the radial direction of the hollow fiber membrane bundle 15 and in which the plurality of diffusing vent holes 43 is formed and the conduit 5 which is arranged to extend in the up-down direction inside the hollow fiber membrane bundle 15 and in which the plurality of pipe vent holes 54A and 54B is formed in a part positioned in the upper space S11.

This arrangement enables bubbling cleaning on the lower end 14A side of the hollow fiber membrane 14 by dispersing gas so as to spread in the radial direction of the hollow fiber membrane bundle 15. Additionally, on the upper end 14B side of the hollow fiber membrane 14, bubbling cleaning can be conducted by dispersing gas from the inside toward the outside of the hollow fiber membrane bundle 15 by the pipe vent holes 54A and 54B.

The pipe vent holes 54 are formed in part of the conduit 5 positioned in the upper space S11 and the lower space S12. Additionally, the hollow fiber membrane module 10 is configured such that raw water to be filtered by the hollow fiber membrane 14 passes through the pipe vent holes 54 positioned in the upper space S11 and the lower space S12 so as to be supplied to the housing 13.

This enables water in the conduit 5 to jet, together with gas, from the pipe vent holes 54 positioned in the upper space S11 by buoyancy of the gas supplied to the conduit 5 and subsequently enables water in the housing 13 to flow into the conduit 5 from the pipe vent hole 54 positioned in the lower space S12. As a result, mixed fluid of liquid and gas can be continuously jetted for bubbling from the pipe vent holes 54 positioned in the upper space S11.

In the hollow fiber membrane module 10, different gas supply means are provided for the conduit 5 and the gas diffusing member 4, respectively. This facilitates adjustment of conditions such as an amount of gas supply to each of the conduit 5 and the diffusing member 4 at the execution of the upper-side and lower-side bubbling steps.

The housing 13 is provided with the extraction port 11 for discharging gas and liquid in the internal space S1 to the outside of the system. The pipe vent hole 54A is formed above the lower face 11A of the extraction port 11 and the pipe vent hole 54B is formed below the lower face 11A of the extraction port 11.

This enables bubbling cleaning to be conducted with gas dispersed from the pipe vent holes 54A and 54B in a state where the internal space S1 is wholly filled with water immediately after the start of the upper-side bubbling step. Then, after a lapse of fixed time after the start of bubbling, even in a state where liquid containing gas is discharged from the extraction port 11 to lower a position of the liquid surface in the internal space S1 to a height position of the lower face 11A of the extraction port 11, it is possible to make water in the conduit 5 jet, together with gas, from the pipe vent hole 54A above the lower face 11A of the extraction port 11 by buoyancy of the gas supplied to the conduit 5 and make water in the housing 13 flow into the conduit 5 from the pipe vent hole 54B below the lower face 11A of the extraction port 11. As a result, mixed fluid of liquid and gas can be continuously jetted from the pipe vent hole 54A above the lower face 11A of the extraction port 11 for bubbling, so that effective cleaning up to the upper end 14B of the hollow fiber membrane 14 is possible.

The hollow fiber membrane bundle 15 is one-end-free type in which the upper end 14B of the hollow fiber membrane 14 is fixed and the lower end 14A of the hollow fiber membrane 14 is not fixed one by one. This enables the hollow fiber membrane 14 to be easily shaken in the bubbling step, thereby further improving a membrane surface cleaning effect.

The cleaning method of the hollow fiber membrane module is a method to clean the hollow fiber membrane 14 by dispersing gas in the internal space S1 filled with water. This cleaning method includes the lower-side bubbling step and the upper-side bubbling step executed after the lower-side bubbling step. In the lower-side bubbling step, the hollow fiber membrane 14 is cleaned by dispersing gas in the housing 13 at a position below the lower space S12. In the upper-side bubbling step, the hollow fiber membrane 14 is cleaned by dispersing gas in the housing 13 at a position of the upper space S11.

In the cleaning method of the hollow fiber membrane module, first in the lower-side bubbling step, suspended solids attached to the membrane surface can be fallen off by dispersing gas in the housing 13 at a position below the lower space S12 such that the gas rises from the lower end 14A of the hollow fiber membrane 14 to shake the hollow fiber membrane 14. Thereafter, in the upper-side bubbling step, by dispersing gas in the housing 13 at the position of the upper space S11, a membrane surface can be reliably cleaned also on the upper end 14B of the hollow fiber membrane 14 whose cleaning is insufficient in the lower-side bubbling step.

Additionally, when the lower-side bubbling step is conducted after the upper-side bubbling step, after the upper end 14B of the hollow fiber membrane 14 is cleaned in the upper-side bubbling step, the suspended solids removed from the membrane surface in the lower-side bubbling step rise to be again attached to the upper end 14B. To the contrary, execution of the upper-side bubbling step after the lower-side bubbling step prevents the suspended solids from being again attached to the upper end 14B of the hollow fiber membrane 14, thereby cleaning the entire hollow fiber membrane 14.

Second Embodiment

Next, description will be made of a structure of a hollow fiber membrane module 10A according to a second embodiment of the present invention with reference to FIG. 8. The hollow fiber membrane module 10A according to the second embodiment basically has the same configuration as in the first embodiment and produces the same effect but is different in the number and position of pipe vent holes 54 formed in the conduit 5 from those of the first embodiment.

Figure 8:
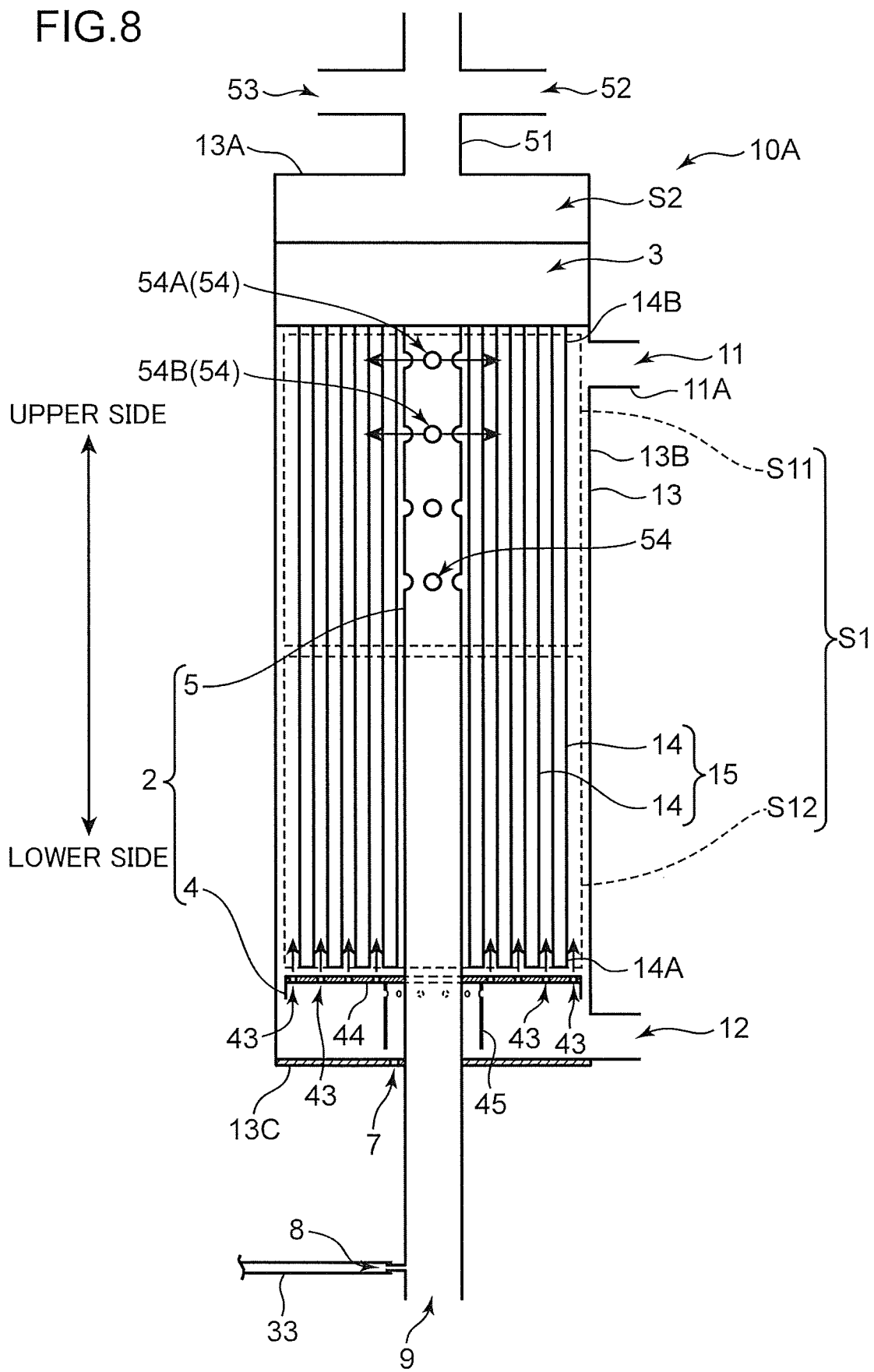
FIG. 8 is a view showing a configuration of a hollow fiber membrane module in a second embodiment of the present invention.

As shown in FIG. 8, in the conduit 5, the plural pipe vent holes 54 are formed at intervals only in a part positioned in the upper space S11 but no pipe vent hole is formed in a part positioned in the lower space S12. In other words, the part of the conduit 5 positioned in the lower space S12 has a closed outer circumference surface with no break. This embodiment enables further reduction in time and labor required for process of the conduit 5 as compared with a case of the first embodiment in which the pipe vent holes 54 are formed in the portion positioned in the upper space S11 and the portion positioned in the lower space S12.

Third Embodiment

Next, description will be made of a structure of a hollow fiber membrane module 10B according to a third embodiment of the present invention with reference to FIG. 9 and FIG. 10. The hollow fiber membrane module 10B according to the third embodiment basically has the same configuration as that of the first embodiment and produces the same effect but is different in a shape of a gas diffusing member from that of the first embodiment.

Figure 9:
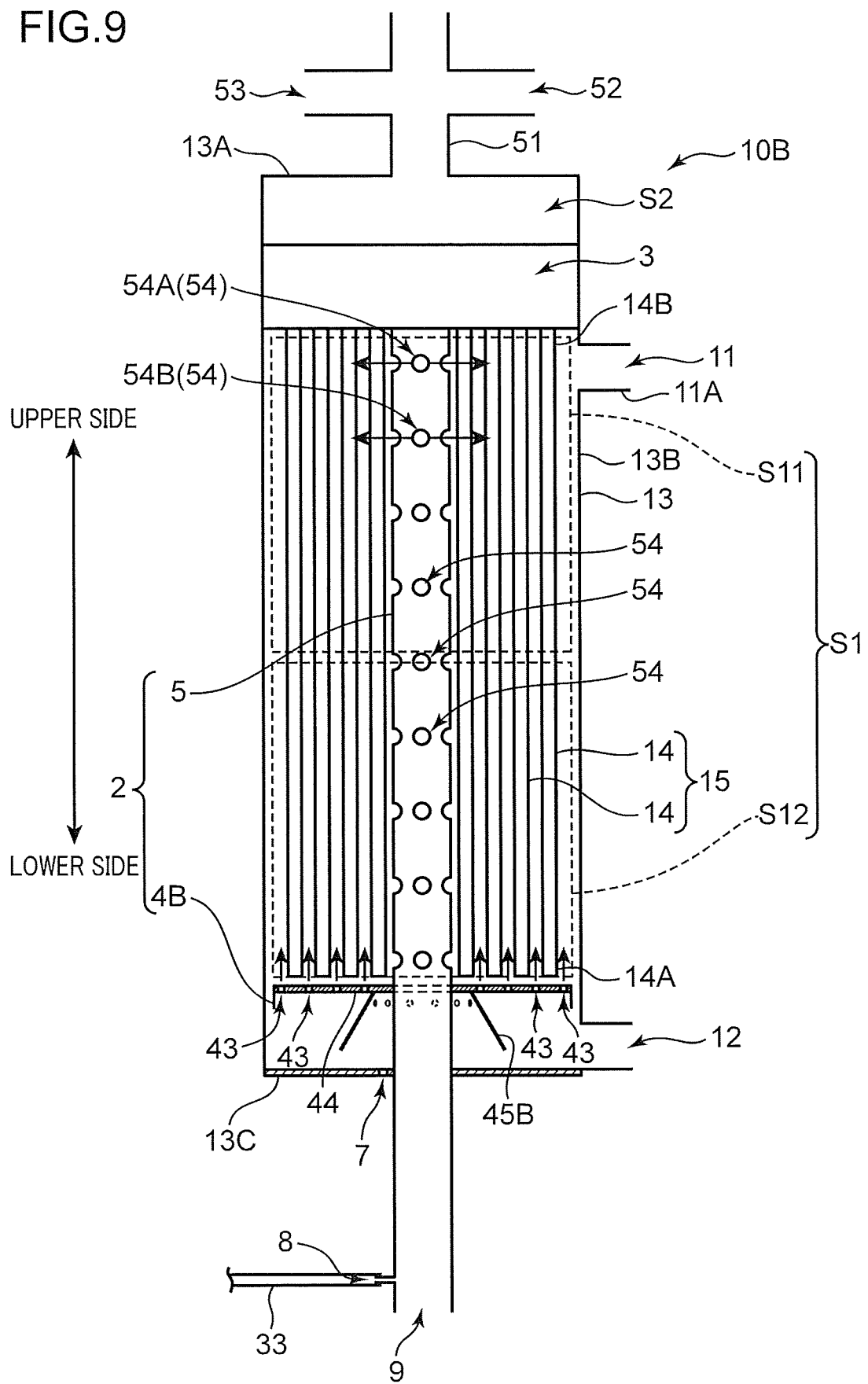
FIG. 9 is a view showing a configuration of a hollow fiber membrane module in a third embodiment of the present invention.
Figure 10:
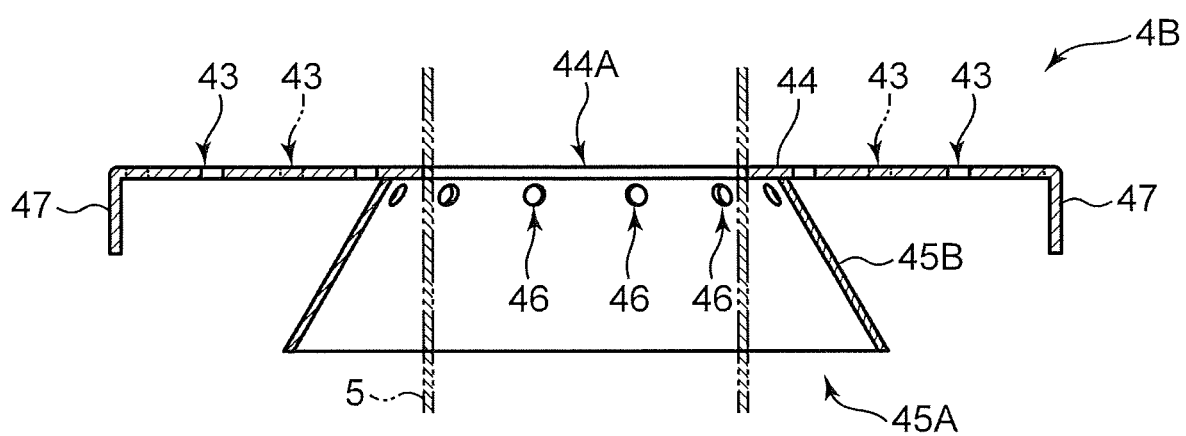
FIG. 10 is a view showing a configuration of a gas diffusing member in the third embodiment of the present invention.

As shown in FIG. 9 and FIG. 10, a gas diffusing member 4B is integrally configured with a disc-shaped main body portion 44 in which diffusing vent holes 43 are formed, a gas receiving portion 45B connected to a back face of the main body portion 44 and a peripheral wall portion 47 connected to a peripheral edge of the main body portion 44. In this embodiment, the gas receiving portion 45B has a flare-shape with an inner diameter gradually spreading from an upper end connected to the back face of the main body portion 44 toward a lower end on which a gas reception port 45A is formed. In a cross sectional view in FIG. 10, a tube wall of the gas receiving portion 45B makes an acute angle with the back face of the main body portion 44, which angle is not particularly limited.

In this embodiment, gas supplied from a diffusing gas entrance 7 into a housing 13 hardly escapes to an outer side of the gas receiving portion 45B and is easily taken into the gas receiving portion 45B. Therefore, compared to the first embodiment in which the gas receiving portion 45 is configured to have a cylindrical shape with a fixed inner diameter, the lower-side bubbling step can be conducted more efficiently. Also in this embodiment, the pipe vent holes 54 can be omitted in a part of the conduit 5 positioned in the lower space S12.

Fourth Embodiment

Figure 11:
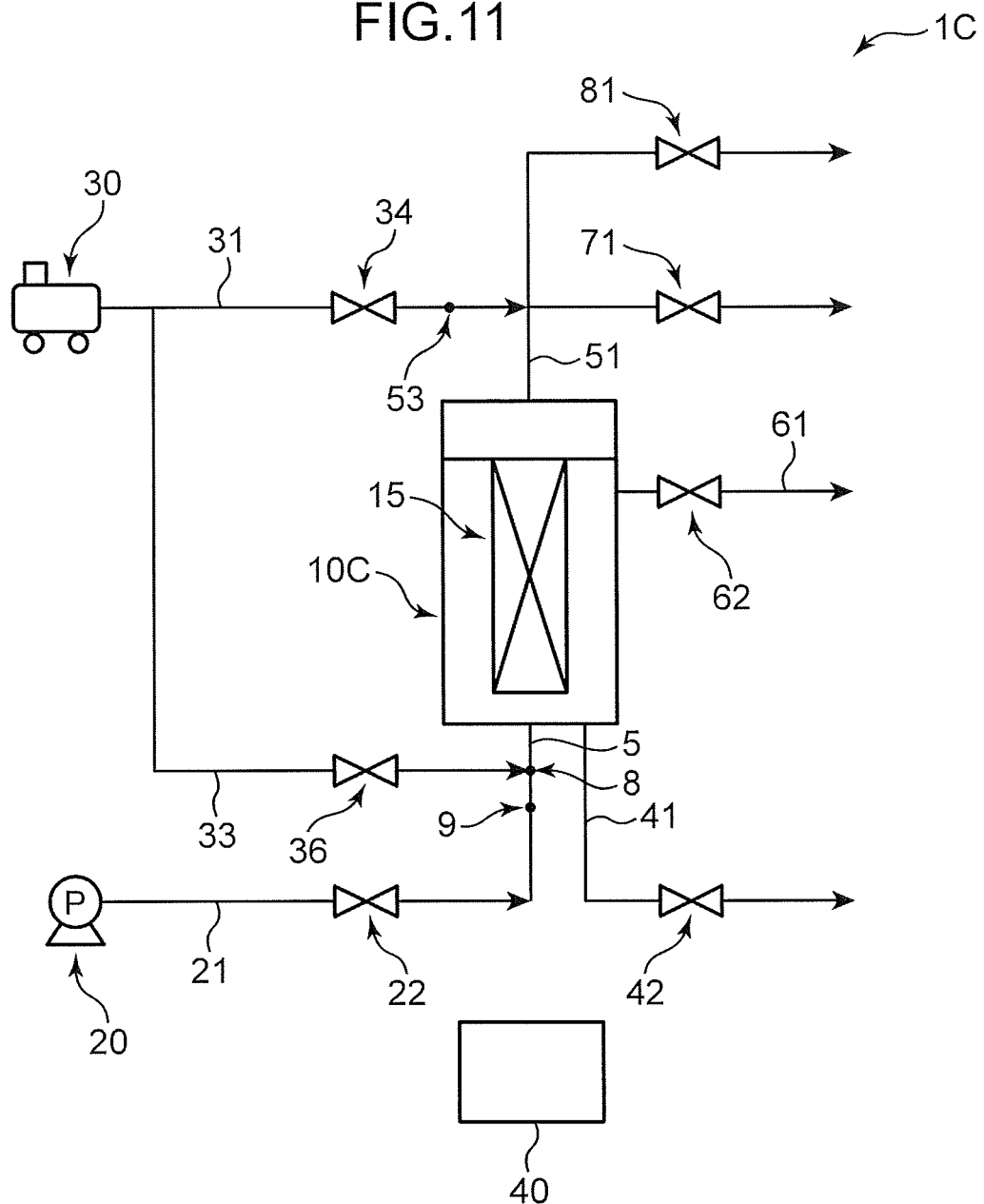
FIG. 11 is a view showing a configuration of a filtering device in a fourth embodiment of the present invention.

Next, description will be made of a structure of a hollow fiber membrane module 10C according to a fourth embodiment of the present invention with reference to FIG. 11 and FIG. 12. The hollow fiber membrane module 10C according to the fourth embodiment basically has the same configuration as that of the first embodiment and produces the same effect but is different from that of the first embodiment in that for the conduit 5 and the gas diffusing member 4, a common gas supply means is provided.

Figure 12:
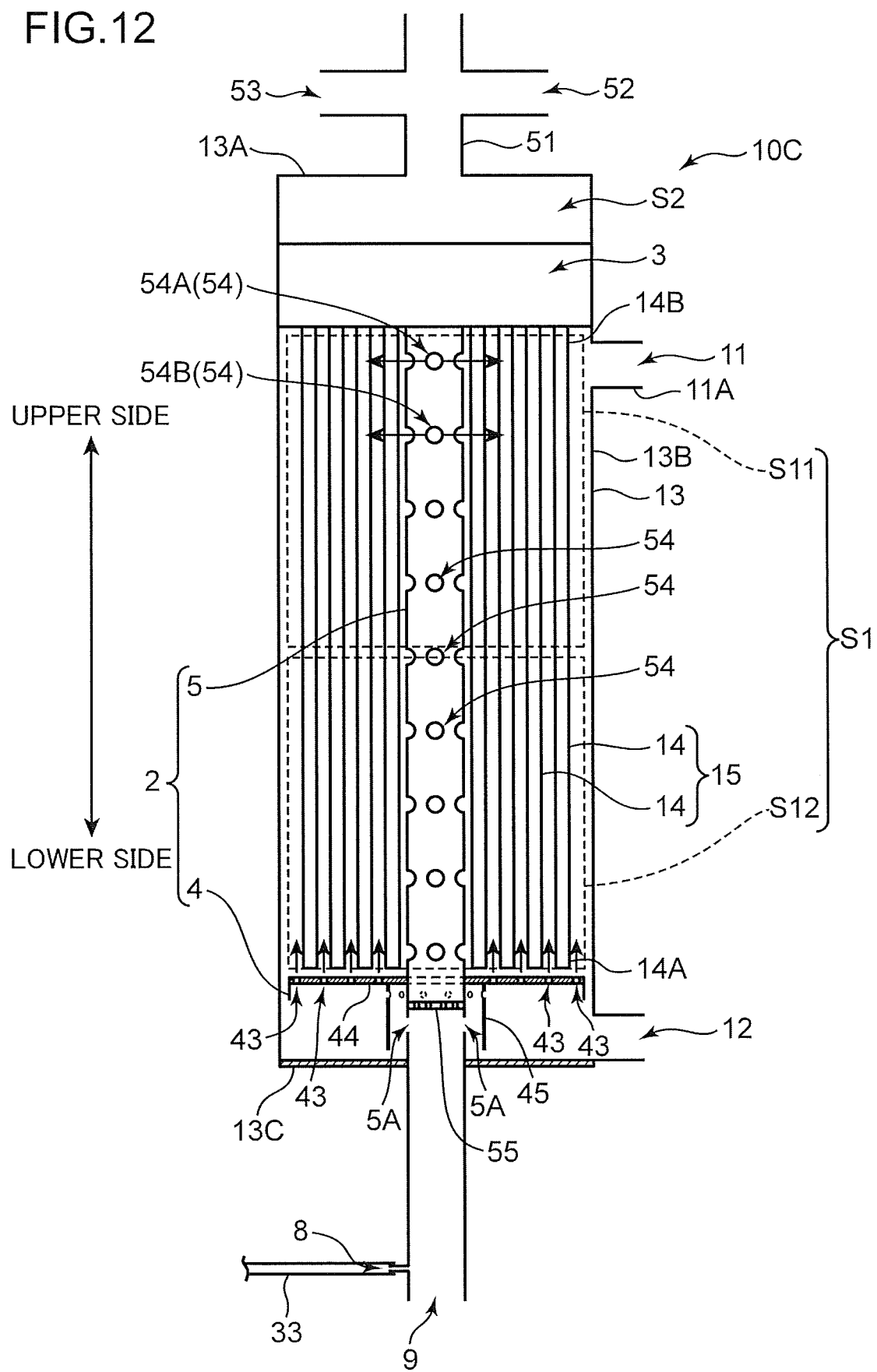
FIG. 12 is a view showing a configuration of a hollow fiber membrane module in the fourth embodiment of the present invention.

As shown in FIG. 12, a lower face 13C of a housing 13 is closed without having a diffusing gas entrance 7 formed (FIG. 2). In an inner region of the conduit 5, a section portion 55 is provided. The section portion 55 is a plate body with a plurality of through holes formed and is arranged in a part of the conduit 5 surrounded by a gas receiving portion 45. Additionally, in the conduit 5, in a part below the section portion 55 and surrounded by the gas receiving portion 45, a vent hole 5A penetrating a tube wall is formed. Additionally, as shown in FIG. 11, in the filtering device 1C, only a third gas introduction piping 33 and a third gas introduction valve 36 are provided as a gas supply mean to a raw water side space of the hollow fiber membrane module 10C, while provision of the second gas introduction piping 32 and the second gas introduction valve 35 (FIG. 1) is omitted.

In this embodiment, gas introduced from a conduit gas entrance 8 into the conduit 5 rises due to buoyancy to pass through the through hole of the section portion 55 to be released from pipe vent holes 54A and 54B positioned in an upper space S11 into the housing 13. Additionally, a part of the gas is intercepted by the section portion 55 in the middle of rising and then released from the vent hole 5A to the outside of the tube. Then, after being housed in the gas receiving portion 45, the released gas passes through diffusing vent holes 43 so as to be dispersed to the lower space S12. Thus, in the fourth embodiment, as a common gas supply mean to the conduit 5 and the diffusing member 4, use of the third gas introduction piping 33 and the third gas introduction valve 36 enables facilities to be simplified as compared with a case where as in the first embodiment, separate gas supply means are provided, thereby reducing a device cost. Also in this embodiment, in a part of the conduit 5 positioned in the lower space S12, pipe vent holes 54 may be omitted.

Fifth Embodiment

Next, description will be made of a structure of a hollow fiber membrane module 10D according to a fifth embodiment of the present invention with reference to FIG. 13. The hollow fiber membrane module 10D according to the fifth embodiment basically has the same configuration as that of the first embodiment and produces the same effect but is different from that of the first embodiment in that the gas diffusing member 4 is omitted.

Figure 13:
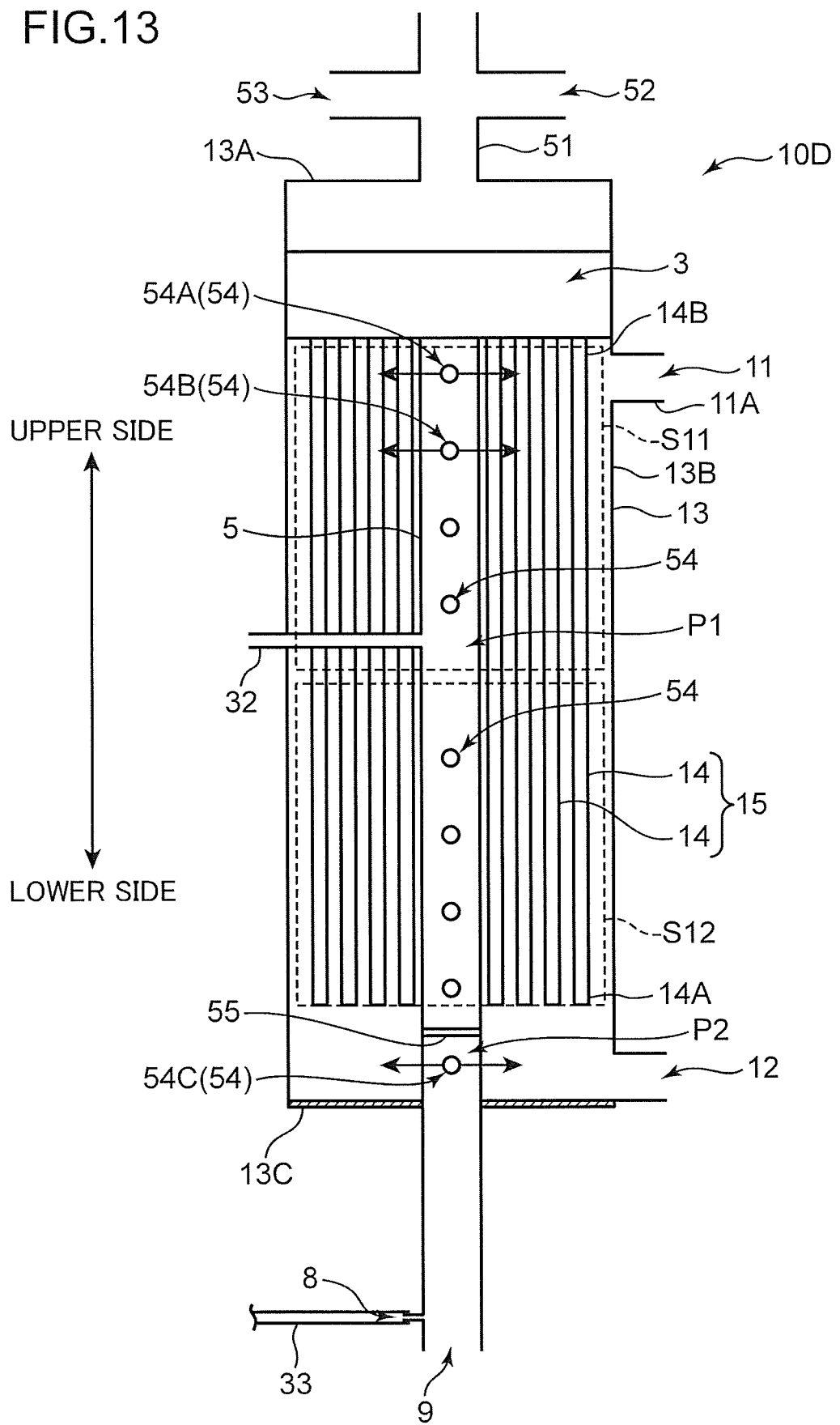
FIG. 13 is a view showing a configuration of a hollow fiber membrane module in a fifth embodiment of the present invention.

As shown in FIG. 13, in a part of the conduit 5 which is inserted into the housing 13, a plurality of pipe vent holes 54 is formed at intervals in a longitudinal direction. In an inner region of the conduit 5, a plate-shaped section portion 55 is provided. This section portion 55 sections a tube inner space of the conduit 5 into a lower-side tube inner space P2 positioned below the lower space S12 and an upper-side tube inner space P1 positioned above the lower-side tube inner space P2. Since the section portion 55 blocks the inner region of the conduit 5, the upper-side tube inner space P1 and the lower-side tube inner space P2 are isolated as different spaces not communicating with each other.

A conduit gas entrance 8 is provided with a third gas introduction piping 33 and a third gas introduction valve 36 as shown in FIG. 1 as gas supply mean for supplying gas to the lower-side tube inner space P2. Additionally, in a part facing the upper-side tube inner space P1, as gas supply mean for supplying gas to the upper-side tube inner space P1, the second gas introduction piping 32 and a second gas introduction valve 35 shown in FIG. 1 are provided. Thus, in the fifth embodiment, the gas supply means are provided for supplying gas to each of the upper-side tube inner space P1 and the lower-side tube inner space P2.

Gas introduced from the conduit gas entrance 8 into the conduit 5 is dispersed into the housing 13 from a pipe vent hole 54C formed in a part facing the lower-side tube inner space P2. In other words, the pipe vent hole 54C functions as a lower-side gas supply portion which disperses gas in the housing 13 at a position below the lower space S12. On the other hand, gas introduced from the second gas introduction piping 32 into the upper-side tube inner space P1 rises due to buoyancy to be dispersed from pipe vent holes 54A and 54B into the housing 13. The pipe vent holes 54A and 54B are formed in a portion of the conduit 5 facing the upper-side tube inner space P1 and positioned in the upper space S11, and function as an upper-side gas supply portion which disperses gas in the housing 13 at a position of the upper space S11.

In this embodiment, by separating the tube inner space of the conduit 5 into the upper-side tube inner space P1 and the lower-side tube inner space P2 by the section portion 55 to enable gas supply to each of the tube inner spaces P1 and P2, whole hollow fiber membrane 14 can be cleaned by bubbling only by the conduit 5 without using the gas diffusing member 4. Therefore, it is possible to simplify the facilities as compared with a case where both the conduit 5 and the gas diffusing member 4 are provided, thereby reducing a device cost.

Figure 14:
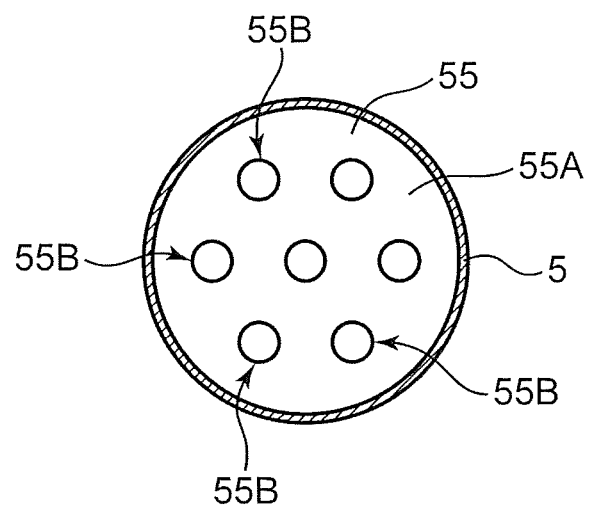
FIG. 14 is a cross sectional view showing a configuration of a conduit in a modification of the fifth embodiment of the present invention.

Additionally, the section portion 55 is not limited to a portion that completely blocks the inner region of the conduit 5, but may be a portion in which a plurality of through holes 55B are formed as shown in FIG. 14. In this case, gas introduced from the conduit gas entrance 8 to the conduit 5 has a part thereof intercepted by a plate body portion 55A of the section portion 55 and dispersed from the pipe vent hole 54C into the housing 13 and the remaining thereof passing through the through holes 55B to flow into the upper-side tube inner space P1 to be dispersed from the pipe vent holes 54A and 54B into the housing 13. Therefore, it is not necessary to provide separate gas supply means for each of the upper-side tube inner space P1 and the lower-side tube inner space P2, and the second gas introduction piping 32 and the second gas introduction valve 35 (FIG. 1) can be omitted. Additionally, in this case, the pipe vent holes 54 positioned above the section portion 55 in the lower space S12 can be omitted.

Sixth Embodiment

Next, description will be made of a sixth embodiment of the present invention with reference to FIG. 15. A hollow fiber membrane module according to the sixth embodiment basically has the same configuration as that of the first embodiment and produces the same effect but is different in that the number of pipe vent holes 54 and an interval of the pipe vent holes 54 in a circumferential direction are different in a part positioned in the upper space S11 and a part positioned in the lower space S12 in the conduit 5.

Figure 15:
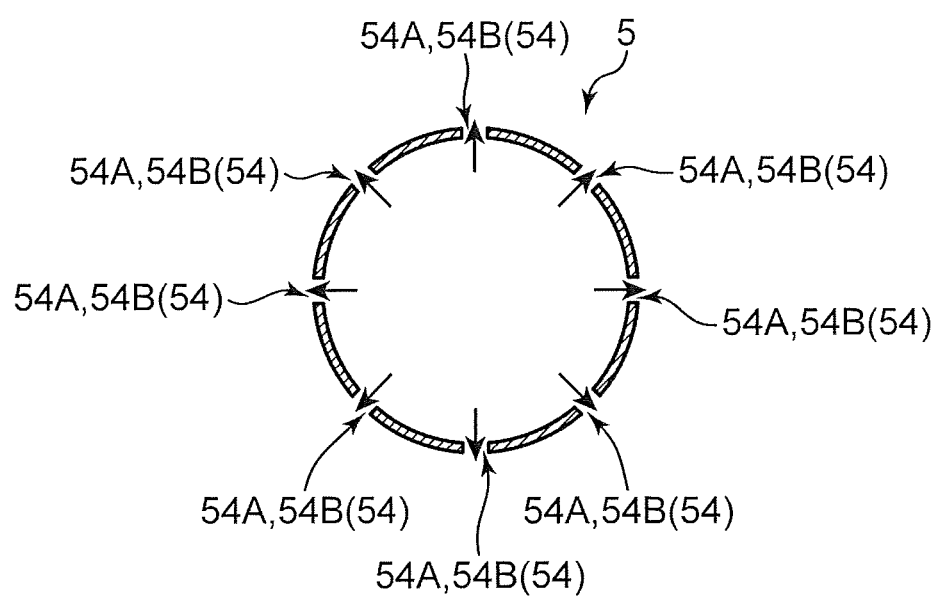
FIG. 15 is a cross sectional view showing a configuration of a conduit in a sixth embodiment of the present invention.

FIG. 15 shows a cross sectional structure of the conduit 5 including pipe vent holes 54A formed in an uppermost part or pipe vent holes 54B below the same. As shown in FIG. 15, eight of the pipe vent holes 54A and 54B are formed at equal intervals (at an interval of 45°) in a circumferential direction. On the other hand, other pipe vent holes 54 are formed four at equal intervals (at an interval of 90°) in the circumferential direction similarly to the first embodiment. Thus, in the sixth embodiment, more pipe vent holes 54 are formed in the circumferential direction in a part positioned in an upper space S11 than in a part positioned in a lower space S12. This enables the bubbling cleaning effect to be enhanced in the entire circumferential direction on the upper end 14B of hollow fiber membrane 14.

OTHER EMBODIMENT

Figure 16:
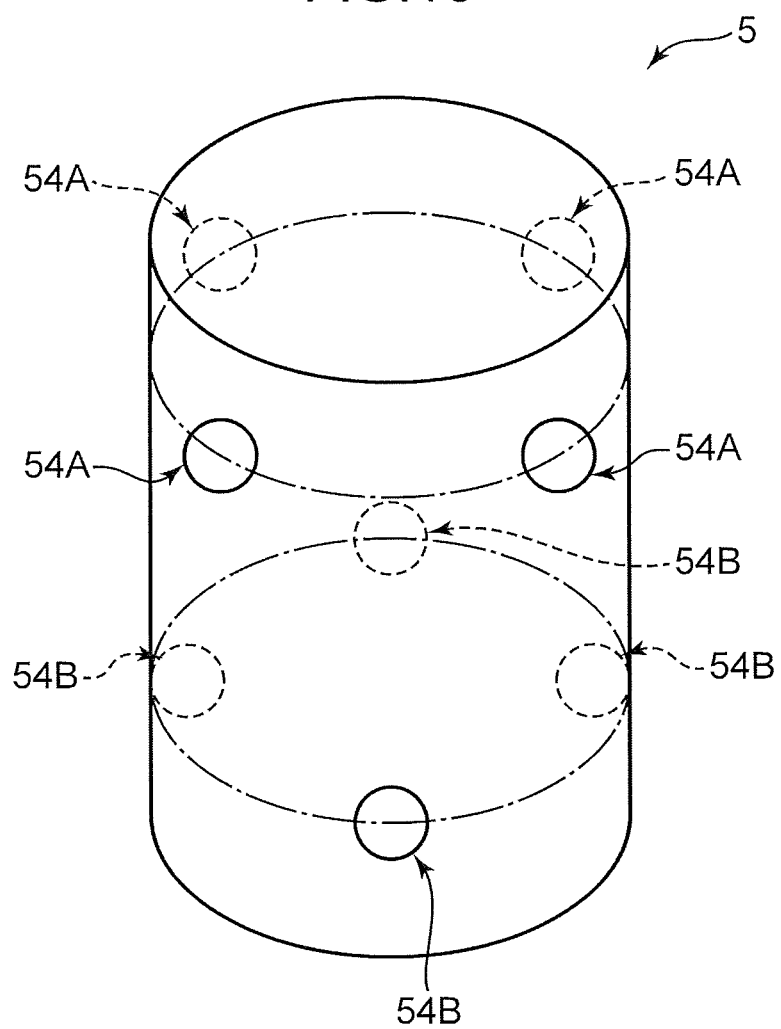
FIG. 16 is a view showing a configuration of a conduit in another embodiment of the present invention.

Pipe vent holes 54A and 54B adjacent to each other in a longitudinal direction of the conduit 5 may be formed to be differently positioned in a circumferential direction when viewed from the longitudinal direction. Specifically, as shown in FIG. 16, the adjacent pipe vent holes 54A and 54B may be displaced by 45° in the circumferential direction when viewed from the longitudinal direction. This enables raw water and gas to be supplied more uniformly in the internal space S1 of the housing 13 in the circumferential direction.

While in the embodiment, the description has been made only of the one-end-free type hollow fiber membrane bundle 15, a both-end-fixed type hollow fiber membrane bundle can be used.

Seventh Embodiment

Next, description will be made of a cleaning method of a hollow fiber membrane module according to a seventh embodiment of the present invention. In the cleaning method of the hollow fiber membrane module according to a seventh embodiment, the water filling step, the filtering step, the backwash step, the lower-side bubbling step and the upper-side bubbling step are sequentially executed as described in the first embodiment. However, the seventh embodiment is different from the first embodiment in executing countercurrent bubbling in the lower-side bubbling step.

Figure 18:
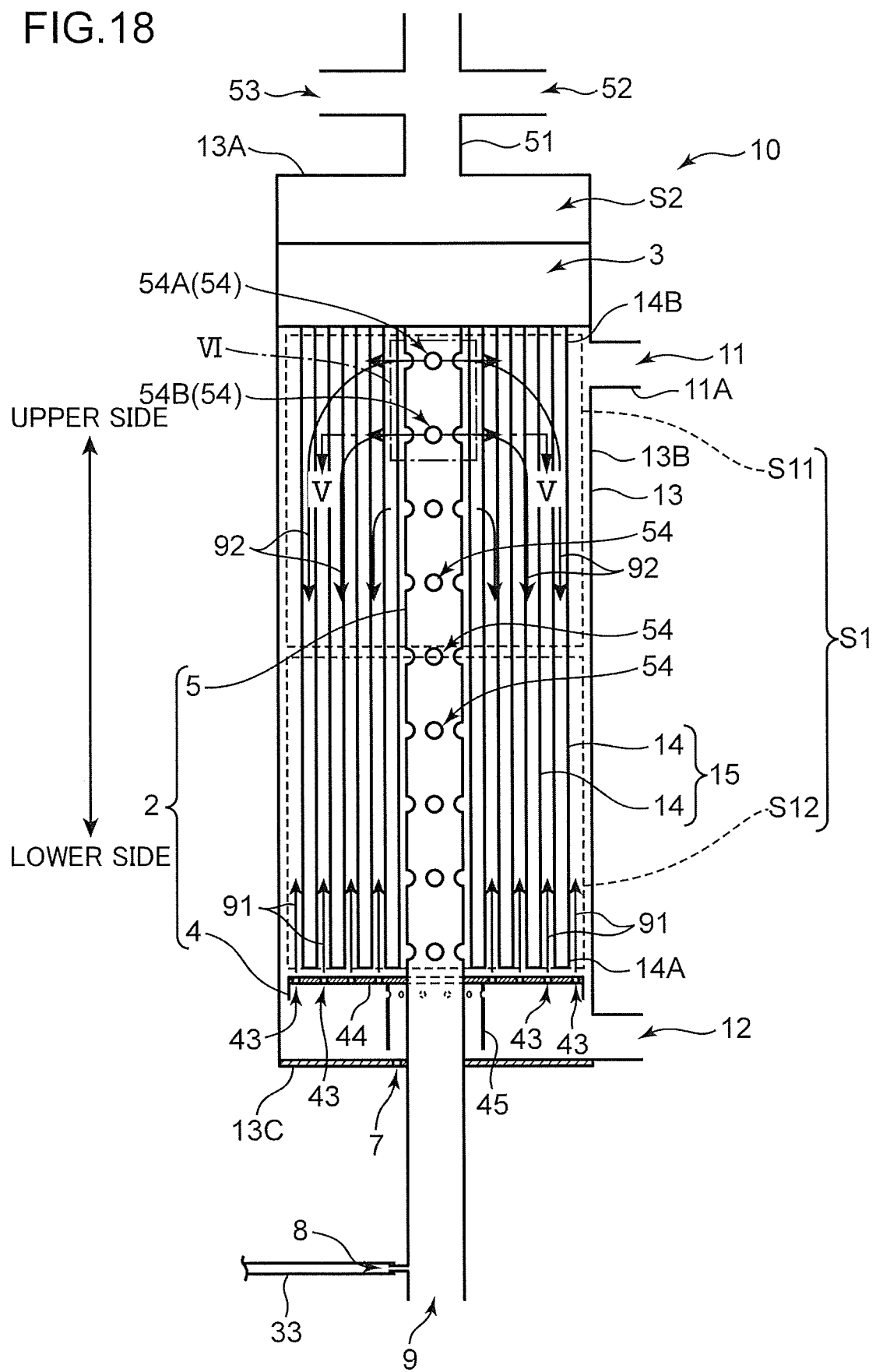
FIG. 18 is a view for explaining a countercurrent bubbling step in a cleaning method of a hollow fiber membrane module of the seventh embodiment of the present invention.

In the seventh embodiment, as shown in FIG. 17, the raw water outlet valve 42 is opened by the control device 40 in the lower-side bubbling step. While in the first embodiment, the raw water outlet valve 42 is closed in the lower-side bubbling step (FIG. 7), opening the raw water outlet valve 42 causes raw water in the internal space S1 to flow toward the drain extraction port 12. This causes a downstream water flow 92 to be generated in which raw water flows from the upper-side to the lower-side in the internal space S1 along a longitudinal direction of hollow fiber membrane 14 as shown in FIG. 18.

Although a gas outlet valve 62 is in an open state, valve opening of the gas outlet valve 62 needs to be adjusted such that an amount of water discharged from the drain extraction port 12 is larger than an amount of water discharged from a gas extraction port 11 in order to form the downstream water flow 92. Specifically, the opening of the raw water outlet valve 42 needs to be larger than the opening of the gas outlet valve 62.

While thus causing the downstream water flow 92 to be generated in the housing 13, the control device 40 causes the second gas introduction valve 35 to be opened, as well as causing the air compressor 30 to operate. As a result, air is supplied from a diffusing gas entrance 7 into the housing 13 via the second gas introduction piping 32. Then, after being housed in the gas receiving portion 45, the air is dispersed from diffusing vent holes 43 to the lower space S12. As shown in FIG. 18, this causes a bubble flow 91 to be generated in the internal space S1, the flow being in an opposite direction (upward) to the water flow 92 along a longitudinal direction of the hollow fiber membranes 14.

At this time, collision between the water flow 92 and the bubble flow 91 generates a strong shearing force (countercurrent bubbling). This shearing force becomes the strongest on a gas-liquid interface in the housing 13. In the cleaning method of the hollow fiber membrane module according to the present embodiment, the strong shearing force enables effective cleaning of the outer surface of the hollow fiber membrane 14, thereby efficiently removing suspended solids attached to the outer surface of the hollow fiber membrane 14 in the filtering step.

Thus, the hollow fiber membrane module according to the present embodiment has countercurrent bubbling means which causes generation of the water flow 92 of raw water in the internal space S1 along the longitudinal direction of the hollow fiber membrane 14 and also causes generation of the bubble flow 91 in the internal space S1 in a direction opposite to the water flow 92 in the longitudinal direction of the hollow fiber membrane 14. The countercurrent bubbling means includes water flow generation means which causes generation of the water flow 92 and bubble flow generation means which causes generation of the bubble flow 91. The water flow generation means has the drain extraction port 12 (discharge portion) which discharges raw water from the internal space S1 on a lower side from a center of the hollow fiber membrane 14 in the longitudinal direction. The bubble flow generation means has the gas diffusing member 4 which disperses air in the internal space S1 at a position lower than the center of the hollow fiber membranes 14 in the longitudinal direction.

Figure 19:
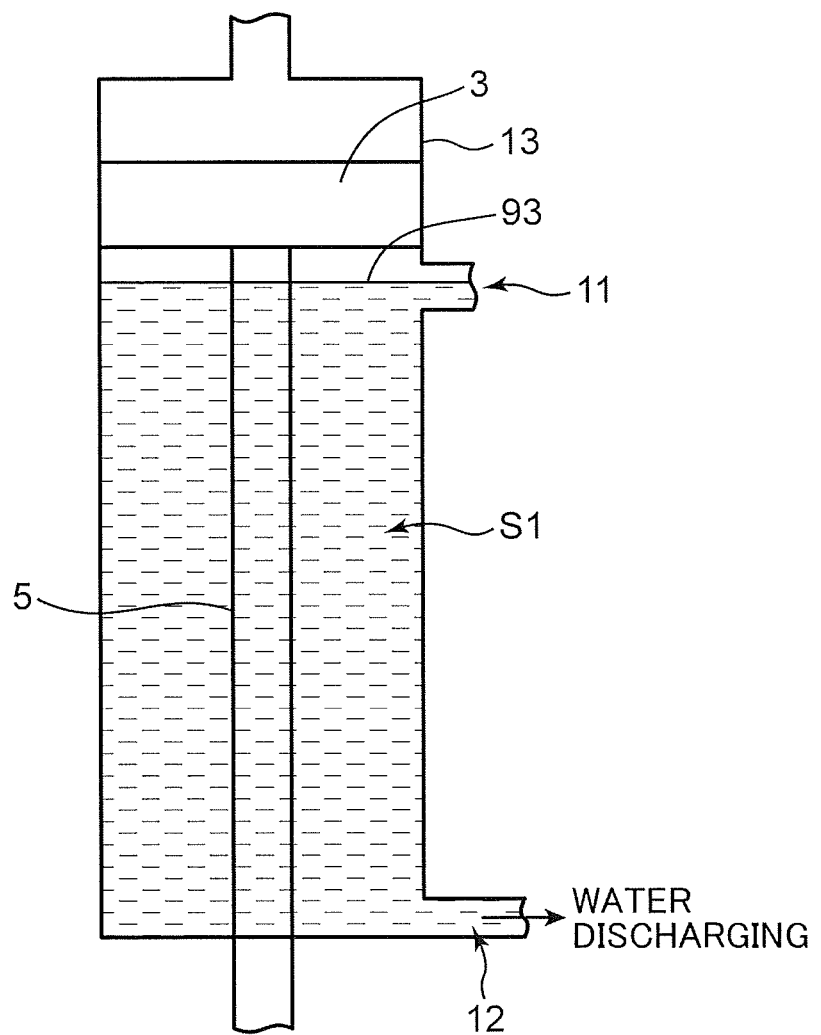
FIG. 19 is a schematic view for explaining how a liquid surface lowers in a housing.
Figure 20:
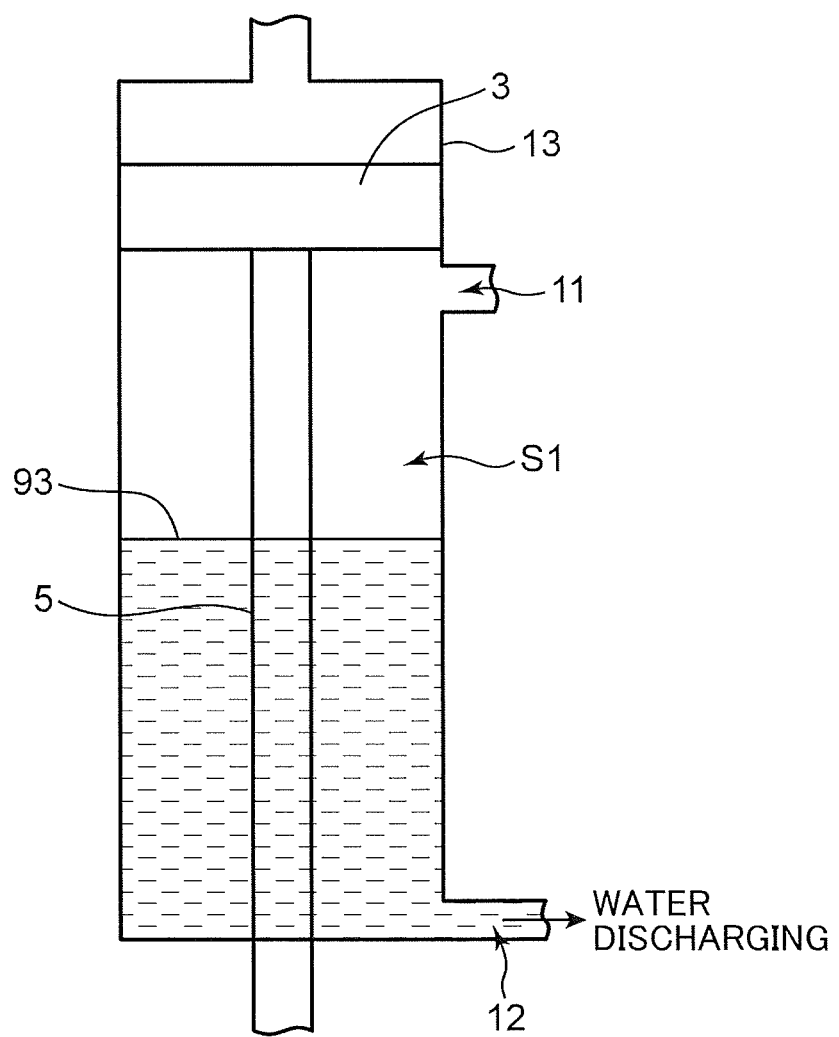
FIG. 20 is a schematic view for explaining how a liquid surface lowers in the housing.
Figure 21:
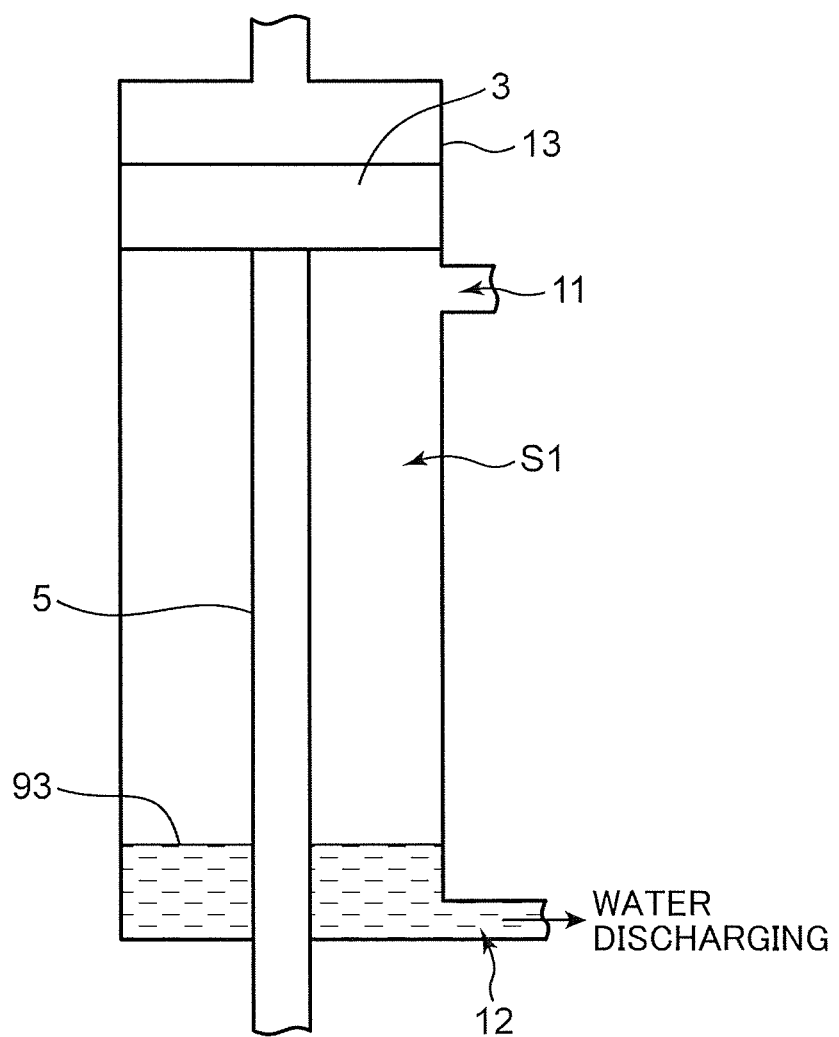
FIG. 21 is a schematic view for explaining how a liquid surface lowers in the housing.

Next, as shown in FIG. 19 to FIG. 21, moving a liquid surface 93 of raw water in the internal space S1 of the housing 13 downward along the longitudinal direction of the hollow fiber membrane 14 enables the outer surface of the hollow fiber membrane 14 to be further effectively cleaned. Specifically, with the gas outlet valve 62 closed by the control device 40, air is continuously supplied from the second gas introduction piping 32 into the housing 13. Then, an amount of air filled in the upper part of the internal space S1 is gradually increased, along with which the amount of water discharged from the drain extraction port 12 is increased. In this process, as sequentially shown in FIG. 19 to FIG. 21, the liquid surface 93 in the internal space S1 gradually moves downward. The liquid surface 93 is a part in which the shearing force becomes the strongest and which has excellent cleaning effect. Therefore, by gradually lowering the liquid surface 93 along the longitudinal direction of the hollow fiber membrane 14, the hollow fiber membrane 14 can be efficiently cleaned over a wide range in the longitudinal direction.

Additionally, as described above, after once lowering the liquid surface 93, the liquid surface 93 can be raised. Specifically, power of the liquid supply pump 20 or opening of the raw water introduction valve 22 and the raw water outlet valve 42 may be adjusted such that an amount of water supplied to the housing 13 is larger than an amount of water discharge, thereby moving the liquid surface 93 upward. Additionally, such up-down movement of the liquid surface 93 can be repeated a plurality of times. This enables further increase in the cleaning effect of the hollow fiber membrane 14.

Additionally, also in this step, a flow rate of air (bubbling flow rate) to be supplied from the second gas introduction piping 32 into the housing 13 is preferably set to be 3 Nm$^3$/h or more and 20 Nm$^3$/h or less in view of generation of strong shearing force and is preferably set to be 5 Nm$^3$/h in view of a capacity of the air compressor 30 or the like.

Next, the water discharging step may be executed. When such a rise of the liquid surface 93 as described above is not conducted, liquid containing suspended solids fallen off from the outer surface of the hollow fiber membrane 14 is discharged to the outside of the system via the drain extraction port 12 simultaneously with countercurrent bubbling. When such liquid containing suspended solids is already discharged at the time of countercurrent bubbling, the water discharging step is not required.

When the water discharging step is executed, the second gas introduction valve 35 is closed and the raw water outlet valve 42 is opened by the control device 40. This causes the liquid containing the suspended solids fallen off from the outer surface of the hollow fiber membrane 14 in the countercurrent bubbling step to be discharged to the outside of the system via the drain extraction port 12.

Additionally, as shown in FIG. 22, in the countercurrent bubbling step, the gas outlet valve 62 can be closed. This prevents water in the housing 13 from being discharged from the gas extraction port 11 in the countercurrent bubbling, so that an amount of water discharged from the drain extraction port 12 is increased to facilitate formation of the downstream water flow 92 in the housing 13.

Eighth Embodiment

Next, description will be made of a cleaning method of a hollow fiber membrane module according to an eighth embodiment of the present invention. In the cleaning method of the hollow fiber membrane module according to an eighth embodiment, the water filling step, the filtering step, the backwash step, the lower-side bubbling step and the upper-side bubbling step are sequentially executed as described in the first embodiment. However, the eighth embodiment is different from the above first embodiment in executing gas-liquid cleaning in the upper-side bubbling step.

As shown in FIG. 23, in the eighth embodiment, the gas outlet valve 62 and the third gas introduction valve 36 are opened by the control device 40 to conduct the upper-side bubbling as in the first embodiment, and the liquid supply pump 20 is operated, and the raw water introduction valve 22 is opened also by the control device 40. As a result, raw water is supplied into the conduit 5 via the raw water introduction piping 21, while air is supplied into the conduit 5 via the third gas introduction piping 33, so that in the conduit 5, a mixture of raw water and air is generated. Then, raw water and air are simultaneously jetted from a plurality of pipe vent holes 54 (holes positioned in the upper space S11) of the conduit 5 toward the upper space S11 of the housing 13 (gas-liquid cleaning).

As a result, strong shearing force is generated in the upper space S11 by the jetted gas-liquid mixture, and the shearing force enables effective cleaning of a part on the upper end 14B of hollow fiber membrane 14. At this time, jetting raw water and air uniformly to the upper space S11 is preferable in view of uniform cleaning in the module. During the cleaning, air is discharged from the gas extraction port 11 to the outside of the system of the module, while raw water is discharged from the drain extraction port 12 to the outside of the system of the module.

Thus, the hollow fiber membrane module according to the present embodiment is provided with gas-liquid supply means for simultaneously supplying raw water and gas into the conduit 5. The gas-liquid supply means is configured with the raw water introduction piping 21, the liquid supply pump 20, the raw water introduction valve 22, the air compressor 30, the third gas introduction piping 33, the third gas introduction valve 36 and the control device 40. The control device 40 enables the liquid supply pump 20 and the air compressor 30 to be simultaneously operated, as well as simultaneously opening the raw water introduction valve 22 and the third gas introduction valve 36. This makes it possible to supply raw water into the conduit 5 via the raw water introduction piping 21 by the liquid supply pump 20, as well as suppling gas into the conduit 5 via the third gas introduction piping 33 by the air compressor 30. Then, from the pipe vent holes 54 of the conduit 5, raw water and air can be simultaneously jetted.

Thereafter, the water discharging step is executed. In this step, similarly to the first embodiment, the gas outlet valve 62 and the raw water outlet valve 42 are opened. Then, water containing suspended solids fallen off from the surface of the hollow fiber membrane 14 in the gas-liquid cleaning step is discharged to the outside of the system via the drain extraction port 12.

Ninth Embodiment

Next, description will be made of a cleaning method of a hollow fiber membrane module according to a ninth embodiment of the present invention. In the cleaning method of the hollow fiber membrane module according to the ninth embodiment, after the water filling step, the filtering step, the backwash step, the lower-side bubbling step and the upper-side bubbling step are sequentially executed as described in the first embodiment, a shower cleaning step is further executed.

As shown in FIG. 24, in the shower cleaning step, the control device 40 conducts control to drive the liquid supply pump 20, as well as opening the raw water introduction valve 22 and opening the gas outlet valve 62. At this time, the raw water outlet valve 42 is maintained in an open state. This brings the housing 13 to have the internal space S1 thereof filled with air. In this state, raw water is supplied from the liquid supply pump 20 to the conduit 5 via the raw water introduction piping 21. The raw water flowing in the conduit 5 is jetted toward the hollow fiber membrane bundle 15 via pipe vent holes 54 of the conduit 5. In other words, the liquid supply pump 20, the raw water introduction piping 21, the conduit 5 and a drain extraction port 12 configure shower cleaning means which jets water supplied from a water supply source into the internal space S1 through the plurality of pipe vent holes 54 after water has been drained.

In the shower cleaning step, by applying a water stream directly to the hollow fiber membrane bundle 15, strong shearing force can be generated in the hollow fiber membrane bundle 15. This enables an increase in the cleaning effect of the hollow fiber membrane bundle 15. Additionally, since the water hit against the hollow fiber membrane bundle 15 flows down on a membrane surface due to gravity, shearing force of the falling water also enables effective cleaning of the hollow fiber membrane bundle 15. The water flowing down along the hollow fiber membrane bundle 15 is discharged from the drain extraction port 12 in a bottom part of the housing 13.

Tenth Embodiment

Next, description will be made of a cleaning method of a hollow fiber membrane module according to a tenth embodiment of the present invention. In the cleaning method of the hollow fiber membrane module according to the tenth embodiment, the water filling step, the filtering step, the backwash step, the lower-side bubbling step and the upper-side bubbling step are sequentially executed as described in the first embodiment. However, the tenth embodiment is different from the first embodiment in executing intermittence bubbling in the lower-side bubbling step and the upper-side bubbling step. In the present embodiment, description will be made of a case where the intermittence bubbling is executed in both the lower-side bubbling step and the upper-side bubbling step.

Description will be first made of the intermittence bubbling executed in the lower-side bubbling step. First, the second gas introduction valve 35 and the gas outlet valve 62 are opened by the control device 40 to operate the air compressor 30 (lower-side intermittence bubbling (ON)). This brings supply of air from the diffusing gas entrance 7 via the second gas introduction piping 32 into the internal space S1 filled with water in the housing 13. Then, after being housed in the gas receiving portion 45, the air is dispersed from diffusing vent holes 43 into the lower space S12. This causes an upward bubble flow 91 to be generated in the internal space S1 along a longitudinal direction of hollow fiber membrane 14. Thus, air (gas) is supplied into the housing 13 for a predetermined time period.

At this time, due to buoyancy caused by gas supplied to the internal space S1, the hollow fiber membrane bundle 15 (element) swells. Then, as time of gas supply is increased, the hollow fiber membrane bundle 15 swells more, so that a gap between the hollow fiber membrane bundle 15 and an inner wall of the housing 13 is reduced. As a result, gas supplied to the internal space S1 has difficulty in passing through an outer circumference portion of the hollow fiber membrane bundle 15. Therefore, as the time of gas supply is increased, a cleaning effect in the outer circumference portion of the hollow fiber membrane bundle 15 relative to an amount of gas supply is reduced.

Then, after supplying gas for fixed time, the second gas introduction valve 35 is closed to stop supply of gas to the internal space S1 filled with water in the housing 13 for a predetermined time period (the lower-side intermittence bubbling (OFF)). This eliminates swelling of the hollow fiber membrane bundle 15 due to buoyancy caused by gas supplied into the housing 13. Additionally, a path which is formed in the hollow fiber membrane bundle 15 by the bubble flow 91 and in which gas easily flows is reset.

Thereafter, again starting supply of gas to the internal space S1 of the housing 13 (the lower-side intermittence bubbling (ON)) enables more effective gas supply to the outer circumference portion of the hollow fiber membrane bundle 15, thereby enhancing the cleaning effect of the outer circumference portion of the hollow fiber membrane bundle 15.

Additionally, as described above, by once stopping supply of gas to the internal space S1 (the lower-side intermittence bubbling (OFF)), a path which is formed in the hollow fiber membrane bundle 15 by the bubble flow 91 and in which gas easily flows is reset. This makes an amount of passing gas, i.e. the cleaning effect, hardly become nonuniform in a cross sectional view of a module, so that the entire hollow fiber membrane bundle 15 can be uniformly cleaned. Further, since intermittent supply of gas into the housing 13 leads to repetition of movement of swelling and shrinkage of the hollow fiber membrane bundle 15, a cleaning effect different from that caused by fluctuation of a membrane by the bubble flow 91 can be applied to further enhance the cleaning effect. Repetition of these steps (the lower-side intermittence bubbling (ON) and the lower-side intermittence bubbling (OFF)) a plurality of times is expected to have more excellent cleaning effect.

Next, in the upper-side bubbling step, as shown in FIG. 25, with a gas outlet valve 62 constantly open, switching of the third gas introduction valve 36 is repeated. In a state where the third gas introduction valve 36 is open, air is supplied into the conduit 5 via the third gas introduction piping 33 and the air is supplied into the housing 13 from the pipe vent holes 54 in an upper part of the conduit 5 (upper-side intermittence bubbling (ON)). On the other hand, in a state where the third gas introduction valve 36 is closed, air supply from the pipe vent holes 54 of the conduit 5 into the housing 13 is stopped (the upper-side intermittence bubbling (OFF)).

Thus, in the cleaning method of the hollow fiber membrane module according to the present embodiment, intermittence bubbling is executed. In the intermittence bubbling, bubbling on (the lower-side intermittence bubbling (ON), the upper-side intermittence bubbling (ON)) supplying gas (air) to the internal space S1 filled with water for a predetermined time period and bubbling off (the lower-side intermittence bubbling (OFF), the upper-side intermittence bubbling (OFF)) stopping the supply of gas to the internal space S1 filled with water for a predetermined time period are repeated.

Additionally, although as shown in FIG. 25, it is a common practice to execute, after the lower-side bubbling step, the water discharging step, and thereafter execute the upper-side bubbling step, this is not always the case. As shown in FIG. 26, the water discharging step may be omitted and the lower-side bubbling step may be followed by execution of the upper-side bubbling step.

Additionally, the above-described intermittence bubbling may be executed only in one of the lower-side bubbling step and the upper-side bubbling step. As shown in FIG. 27, only in the lower-side bubbling step, the intermittence bubbling may be executed and in the upper-side bubbling step, the intermittence bubbling may not be executed. Conversely, only in the upper-side bubbling step, the intermittence bubbling may be executed and in the lower-side bubbling step, the intermittence bubbling may not be executed.

EXAMPLES

Example 1

First, a hollow fiber membrane module 10 used in the present example will be described with reference to FIG. 2.

As a hollow fiber membrane bundle 15, a one-end-free type with a membrane area of 28 m² was used. A hollow fiber membrane 14 used was made of polyvinylidene fluoride resin hydrophilized with polyvinyl alcohol having an average hole diameter of 0.02 microns and an effective length of 890 mm.

The membrane area is defined as di×π×effective length× the number of membranes by an effective length (m) of the hollow fiber membrane 14, an outer diameter di(m) of the hollow fiber membrane 14 and the number of the hollow fiber membrane 14 introduced into the housing 13.

The effective length is a length in which the hollow fiber membrane 14 effectively function in the filtering processing and is a length from an interface between the hollow fiber membrane 14 and the fixing member 3 to the lower end 14A. Although the upper end 14B is an opening portion fixed by the fixing member 3, since space fixed by the fixing member 3 fails to function in water filtering processing, a length of the above part is defined as an effective length.

The average hole diameter was measured in the following manner. First, blocking rates of at least two kinds of particles (Cataloid SI-550, Cataloid SI-45P, Cataloid SI-80P, etc., products of JGC Catalysts and Chemicals Ltd.) having different particle sizes were measured. Then, on the basis of a measurement value, a value of S when R becomes 90 in an approximate equation below was obtained as an average hole diameter.

$$R=100/(1-m\times\exp(-a\times\log(S)))$$

"a" and "m" in the above equation are constants determined by the hollow fiber membrane 14, and are calculated on the basis of the measurement values of two or more kinds of blocking rates.

A content of a hydrophilic resin (polyvinyl alcohol) in the hollow fiber membrane 14 was measured in the following manner. First, a polyvinylidene fluoride resin was dissolved with a solvent and extracted. Thereafter, a dry weight of an undissolved remainder was measured to calculate a content of a hydrophilic resin. In the present example, the content of the hydrophilic resin was 5.7%.

A proportion of a pure water permeation speed ((FLUXd/FLUXw)×100) of the hollow fiber membrane 14 was 99%. Additionally, a water permeability of the hollow fiber membrane 14 at an inter-membrane differential pressure of 0.1 MPa was 1500 L/m²/t.

A cylindrical-shaped conduit 5 with a length of 985 mm and an inner diameter of 40 mm was used. The conduit 5 was arranged at the center of the hollow fiber membrane bundle 15 and fixed together with the hollow fiber membrane bundle 15 by the fixing member 3. In the conduit 5, a plurality of (a total of 36) pipe vent holes 54 were formed at an interval of 100 mm from a position 70 mm apart from the fixing member 3 in the longitudinal direction. The pipe vent holes 54 were formed at an interval of 90° in the circumferential direction so as to have a hole diameter of 10 mm.

The gas diffusing member 4 was attached to a position 915 mm apart from the fixing member 3 in the longitudinal direction. The gas diffusing member 4 is formed with the disc-shaped main body portion 44 in which the plurality of diffusing vent holes 43 are formed, the gas receiving portion 45 and the peripheral wall portion 47. As a gas supply port to the conduit 5, the conduit gas entrance 8 was provided and as a gas supply port to the gas receiving portion 45 of the gas diffusing member 4, the diffusing gas entrance 7 was provided.

Using the above hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by an external pressure dead-end filtration method. Then, after the filtering operation, back-pressure wash was conducted with 0.2 MPa of compressed air from a filtrate side of the hollow fiber membrane module 10 and thereafter, the bubbling cleaning shown in FIG. 7 was conducted. An air flow rate for bubbling on both the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning was 99%.

Comparative Example 1

As a substitute for the conduit 5, a bar-shaped supporting member with an outer circumference of 21.7 mm and a length of 940 mm was arranged at the center of the hollow fiber membrane bundle 15. The other conditions were the same as those of Example 1.

Similarly to Example 1, using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after back-pressure wash was conducted with 0.2 MPa of compressed air from a filtrate side of the hollow fiber membrane module 10, the bubbling cleaning was conducted. Since in Comparative Example 1, no conduit was used, "the filling water (before the upper-side bubbling)", "the upper-side bubbling" and "the water discharging" steps shown in FIG. 7 were omitted. Relative to an amount of SS supplied to the hollow fiber membrane module 10 during the filtering operation, a proportion of an amount of SS discharged in the bubbling cleaning was 82%.

Comparative Example 2

Similarly to Example 1, a cylindrical-shaped conduit 5 with a length of 985 mm and an inner diameter of 40 mm was arranged at the center of the hollow fiber membrane bundle 15. In the conduit 5, a plurality of (a total of 20) pipe vent holes 54 were formed at an interval of 100 mm from a position 470 mm apart from the fixing member 3 in the longitudinal direction. The pipe vent holes 54 were formed at an interval of 90° in the circumferential direction so as to have a hole diameter of 10 mm. The other conditions were the same as those of Example 1.

Similarly to Example 1, using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after back-pressure wash was conducted with 0.2 MPa of compressed air from a filtrate side of the hollow fiber membrane module 10, the bubbling cleaning was conducted. Relative to an amount of SS supplied to the hollow fiber membrane module 10 during the filtering operation, a proportion of an amount of SS discharged in the bubbling cleaning was 63%. It can be found from the foregoing results that Example 1 has more excellent dischargeability of suspended solids attached to a surface of a hollow fiber membrane than in Comparative Examples 1 and 2.

Example 2

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, the intermittent bubbling was conducted in both the lower-side bubbling step and the upper-side bubbling step as shown in FIG. 25. An air flow rate for bubbling on both the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning was 99%.

Example 3

The filtering processing and the cleaning were conducted similarly to Example 2, except that an SS concentration of raw water was changed to 500 mg/L and time for the constant-flow filtering was changed to 30 minutes. A proportion of an amount of SS discharged at this time was 96%. When cleaning was conducted in the mode of Example 1 after conducting the filtering processing under the same condition, a proportion of the amount of SS discharged was 83%. From this result, improvement in the cleaning effect obtained by conducting the intermittence bubbling in the upper-side and lower-side bubbling steps was confirmed.

Example 4

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, the intermittent bubbling was conducted in both the lower-side bubbling step and the upper-side bubbling step as shown in FIG. 26. An air flow rate for bubbling on both the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning was 97%.

Example 5

The filtering processing and the cleaning were conducted similarly to Example 4, except that an SS concentration of raw water was changed to 500 mg/L and time for the constant-flow filtering was changed to 30 minutes. A proportion of an amount of SS discharged at this time was 93%. When cleaning was conducted in the mode of Example 1 after conducting the filtering processing under the same condition, a proportion of the amount of SS discharged was 83%. From this result, improvement in the cleaning effect obtained by conducting the intermittence bubbling in the upper-side and lower-side bubbling steps was confirmed.

Example 6

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, the intermittent bubbling was conducted in the lower-side bubbling step and the upper-side bubbling step was conducted without intermittence bubbling as shown in FIG. 27. An air flow rate for bubbling on the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning was 99%.

Example 7

The filtering processing and the cleaning were conducted similarly to Example 6, except that an SS concentration of raw water was changed to 500 mg/L and time for the constant-flow filtering was changed to 30 minutes. A proportion of an amount of SS discharged at this time was 96%. When cleaning was conducted in the mode of Example 1 after conducting the filtering processing under the same condition, a proportion of the amount of SS discharged was 83%. From this result, improvement in the cleaning effect obtained by conducting the intermittence bubbling in the lower-side bubbling step was confirmed.

Example 8

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, countercurrent bubbling was conducted in the lower-side bubbling step as shown in FIG. 22. An air flow rate for bubbling on both the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning was 94%.

Example 9

The filtering processing and the cleaning were conducted similarly to Example 8, except that an SS concentration of raw water was changed to 500 mg/L and time for the constant-flow filtering was changed to 30 minutes. A proportion of an amount of SS discharged at this time was 93%. When cleaning was conducted in the mode of Example 1 after conducting the filtering processing under the same condition, a proportion of the amount of SS discharged was 83%. From this result, improvement in the cleaning effect obtained by conducting the countercurrent bubbling in the lower-side bubbling step was confirmed.

Example 10

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, gas-liquid cleaning was conducted in the upper-side bubbling step as shown in FIG. 23. An air flow rate for bubbling on both the gas diffusing member 4 side and the conduit 5 side was set to be 1700 NL/h. Additionally, a flow rate of raw water in the gas-liquid cleaning was set to be 3000 L/h by adjusting the raw water introduction valve 22. Relative to an amount of SS supplied to the hollow fiber membrane module 10 during the filtering operation, a proportion of an amount of SS discharged by the bubbling cleaning was 98%.

Example 11

The filtering processing and the cleaning were conducted similarly to Example 10, except that an SS concentration of raw water was changed to 500 mg/L and time for the constant-flow filtering was changed to 30 minutes. A proportion of an amount of SS discharged at this time was 96%. When cleaning was conducted in the mode of Example 1 after conducting the filtering processing under the same condition, a proportion of the amount of SS discharged was 83%. From this result, improvement in the cleaning effect obtained by conducting the gas-liquid cleaning in the upper-side bubbling step was confirmed.

Example 12

The same hollow fiber membrane module 10 as in Example 1 was used. Using this hollow fiber membrane module 10 and using model water consisting of suspension liquid of ferric hydroxide and having an SS concentration of 250 mg/L as raw water, constant-flow filtering was conducted at a flow rate of 4700 L/h for 16 minutes by the external pressure dead-end filtration method. Then, after the filtering operation, back-pressure wash was conducted with 0.2 MPa of compressed air from a filtrate side of the hollow fiber membrane module 10. Thereafter, shower cleaning was further additionally conducted as shown in FIG. 24. A flow rate of raw water in the shower cleaning was set to be 3000 L/h by adjusting the raw water introduction valve 22. An air flow rate for bubbling on both the gas diffusing member 4 side and the conduit 5 side was set to be 1700 NL/h. Relative to an amount of SS supplied to the hollow fiber membrane module 10 during the filtering operation, a proportion of an amount of SS discharged by the bubbling cleaning and the shower cleaning was 99%.

Example 13

The filtering processing and the cleaning were conducted similarly to Example 12, except that an SS concentration of raw water was changed to 500 mg/L and time for the constant-flow filtering was changed to 30 minutes. A proportion of an amount of SS discharged at this time was 99%. When cleaning was conducted in the mode of Example 1 after conducting the filtering processing under the same condition, a proportion of the amount of SS discharged was 83%. From this result, improvement in the cleaning effect obtained by conducting the shower cleaning was confirmed.

The embodiments are summarized as follows.

(1) The hollow fiber membrane module according to the present embodiment is an external pressure filtering type hollow fiber membrane module. The hollow fiber membrane module comprises a hollow fiber membrane bundle having a plurality of bundled hollow fiber membranes, a housing with an internal space formed in which the hollow fiber membrane bundle is housed and a gas supply portion which disperses cleaning gas for the hollow fiber membranes in the internal space. The internal space has an upper space in which an upper-side part of the hollow fiber membrane above a center of the hollow fiber membrane in a longitudinal direction is positioned and a lower space in which a lower-side part of the hollow fiber membrane below the center of the hollow fiber membrane in the longitudinal direction is positioned. The gas supply portion is provided with an upper-side gas supply portion which disperses gas in the housing at a position of the upper space and a lower-side gas supply portion disperses gas in the housing at a position below the lower space.

According to the above hollow fiber membrane module, with the internal space of the housing filled with water, by dispersing gas from the lower-side gas supply portion so that the gas rises from the lower end of the hollow fiber membrane to shake the hollow fiber membrane, suspended solids attached to the membrane surface can be fallen off. Additionally, according to the above hollow fiber membrane module, gas can be dispersed in the housing not only from the lower-side gas supply portion but also from the upper-side gas supply portion. Therefore, it is possible to spread gas up to the upper end of the hollow fiber membrane where gas hardly spreads when gas is dispersed from the lower side, unlike a conventional case where in a bubbling step, gas is dispersed only on the lower end side of the hollow fiber membrane. This increases an effect of removing suspended solids attached to the membrane surface also on the upper end. Accordingly, the above hollow fiber membrane module enables the whole hollow fiber membrane to be cleaned in the bubbling step.

(2) In the above hollow fiber membrane module, the gas supply portion may include a gas diffusing member which is arranged below the lower space, which has a shape extending in a radial direction of the hollow fiber membrane bundle and in which a plurality of diffusing vent holes are formed at intervals in the radial direction and a pipe member which is arranged to extend in an up-down direction inside the hollow fiber membrane bundle and in which a plurality of pipe vent holes is formed at intervals at least in a part positioned in the upper space. The upper-side gas supply portion may be configured with the pipe vent hole formed at a part of the pipe member positioned in the upper space. The lower-side gas supply portion may be configured with the diffusing vent holes formed in the gas diffusing member.

The above configuration enables bubbling cleaning on the lower end side of the hollow fiber membrane by dispersing gas so as to spread from the vent hole formed in the gas diffusing member in the radial direction of the hollow fiber membrane bundle. Additionally, on the upper end side of the hollow fiber membrane, bubbling cleaning can be conducted by dispersing gas from the inside toward the outside of the hollow fiber membrane bundle by the pipe vent holes formed in the pipe member.

(3) In the above hollow fiber membrane module, the pipe vent hole may be formed in part of the pipe member positioned in the upper space and the lower space. Additionally, the above hollow fiber membrane module may be configured such that raw water to be filtered by the hollow fiber membrane passes through the pipe vent hole positioned in the upper space and the lower space so as to be supplied into the housing.

According to the above configuration, raw water can be supplied in the filtering step over the entire longitudinal direction of the hollow fiber membrane from the vent holes formed in the pipe member. Therefore, it is possible to removed suspended solids attached to the membrane surface over the entire hollow fiber membrane by using a flow of the raw water while conducting filtering of the raw water.

(4) In the above hollow fiber membrane module, the pipe vent hole may be formed only in a part of the pipe member positioned in the upper space.

According to the above configuration, time and labor required for process of the pipe member can be reduced to be smaller than in a case where the vent holes are formed over the entire pipe member.

(5) In the above hollow fiber membrane module, gas supply means different from each other may be provided for the pipe member and the gas diffusing member, respectively.

The above configuration enables appropriate switching of such conditions as an amount of gas supply and timing of supply to each of the pipe member and the gas diffusing member according to an object.

(6) In the above hollow fiber membrane module, the gas diffusing member may include a plate-shaped main body portion which has a shape extending in the radial direction of the hollow fiber membrane bundle and in which a plurality of the diffusing vent holes are formed at intervals in the radial direction and a gas receiving portion which has a cylindrical shape with one end connected to a back face of the main body portion and the other end on which a gas reception port is formed and in which a dispersion hole is formed for guiding gas housed in the gas receiving portion to the diffusing vent holes. The gas receiving portion may have a shape with an inner diameter spreading from the one end toward the other end.

With the above configuration, gas supplied into the housing in the bubbling step can be easily taken in from the gas reception port. Therefore, as compared with a case where the gas receiving portion has a cylindrical shape with a fixed inner diameter, bubbling cleaning can be conducted more efficiently.

(7) In the above hollow fiber membrane module, the gas supply portion may include a pipe member which is arranged to extend in an up-down direction inside the hollow fiber membrane bundle and in which a plurality of pipe vent holes are formed at intervals. The pipe member may be provided with a section portion which sections a tube inner space into a lower-side tube inner space positioned below the lower space and an upper-side tube inner space positioned above the lower-side tube inner space. The above hollow fiber membrane module may be provided with gas supply means for supplying gas to each of the upper-side tube inner space and the lower-side tube inner space. The upper-side gas supply portion may be configured with the pipe vent hole which is formed in a part of the pipe member facing to the upper-side tube inner space and positioned in the upper space. The lower-side gas supply portion may be configured with the pipe vent holes formed in a part of the pipe member facing the lower-side tube inner space.

With the above configuration, by separating the inside of the pipe member into the upper-side tube inner space and the lower-side tube inner space by the section portion to enable gas supply to each of the tube inner spaces, whole hollow fiber membranes can be cleaned by bubbling only by the pipe member without using the gas diffusing member. Therefore, it is possible to more simplify the facilities to enable cost reduction.

(8) In the above hollow fiber membrane module, the housing may be provided with an extraction port for discharging gas and liquid in the internal space to the outside of the system. The pipe vent holes can be formed above and below a lower face of the extraction port.

With the above configuration, bubbling cleaning can be conducted with gas dispersed from the vent holes above and below the back face of the extraction port in a state where the internal space of the housing is wholly filled with water immediately after the start of the bubbling. Then, after a lapse of fixed time after the start of bubbling, even in a state where water and gas are discharged from the extraction port to lower a position of a liquid surface in the housing to a height position of the back face of the extraction port, it is possible to make water in the pipe member jet, together with gas, from the vent hole above the back face of the extraction port by buoyancy of the gas supplied to the pipe member and subsequently make water in the housing flow into the pipe member from the vent hole below the back face of the extraction port. As a result, mixed fluid of liquid and gas can be continuously jetted from the vent hole above the back face of the extraction port, so that effective cleaning up to the upper end of the hollow fiber membranes is possible. Additionally, in a state where water is filled above the back face of the extraction port, the hollow fiber membrane can be effectively cleaned up to the upper end thereof with gas dispersed from a position above the back face of the above extraction port.

(9) In the above hollow fiber membrane module, more of the pipe vent holes may be formed in the circumferential direction in a part positioned in the upper space than in a part positioned in the lower space.

With the above configuration, the cleaning effect can be enhanced in the entire circumferential direction on an upper end side of the hollow fiber membrane.

(10) In the above hollow fiber membrane module, the hollow fiber membrane bundle can be one-end-free type in which an upper end of the hollow fiber membrane is fixed and the lower end of the hollow fiber membrane is not fixed one by one.

With the above configuration, the hollow fiber membrane can be easily shaken by bubbling, thereby further improving a membrane surface cleaning effect.

(11) A cleaning method of a hollow fiber membrane module according to an another aspect of the present invention is the method in which a hollow fiber membrane is cleaned by dispersing gas in an internal space of a housing filled with water. The hollow fiber membrane module is external pressure filtering type, and is configured such that a hollow fiber membrane bundle having a plurality of bundled hollow fiber membranes is housed in the internal space of the housing. The internal space has an upper space in which an upper-side part of the hollow fiber membrane above a center of the hollow fiber membrane in a longitudinal direction is positioned and a lower space in which a lower-side part of the hollow fiber membrane below the center of the hollow fiber membrane in the longitudinal direction is positioned. The above cleaning method of the hollow fiber membrane module comprises a lower-side bubbling step of dispersing gas in the housing at a position below the lower space to clean the hollow fiber membrane and an upper-side bubbling step of dispersing gas in the housing at a position in the upper space after the lower-side bubbling step to clean the hollow fiber membrane.

In the above cleaning method of the hollow fiber membrane module, first, in the lower-side bubbling step, by dispersing gas in the housing at a position below the lower space such that the gas rises from the lower end of the hollow fiber membrane to shake the hollow fiber membrane, suspended solids attached to the membrane surface can be fallen off. Thereafter, in the upper-side bubbling step, by dispersing gas in the housing at the position of the upper space, a membrane surface can be reliably cleaned also on the upper end of the hollow fiber membrane whose cleaning is insufficient in the lower-side bubbling step.

Additionally, when the lower-side bubbling step is conducted after the upper-side bubbling step, after the upper end of the hollow fiber membrane is cleaned in the upper-side bubbling step, the suspended solids removed from the membrane surface in the lower-side bubbling step rise to be again attached to the upper end. To the contrary, in the above cleaning method of the hollow fiber membrane module, execution of the upper-side bubbling step after the lower-side bubbling step prevents the suspended solids from being again attached to the upper end of the hollow fiber membrane. Therefore, it is possible to clean the entire hollow fiber membrane.

(12, 13) In the above cleaning method of the hollow fiber membrane module, at least in one of the lower-side bubbling step and the upper-side bubbling step, an intermittence bubbling repeating bubbling on and bubbling off may be executed. In the bubbling on, gas is supplied to the housing for a predetermined time period. In the bubbling off, supply of gas to the housing is stopped for a predetermined time period. Additionally, the intermittence bubbling may be executed only in the lower-side bubbling step.

With this method, since bubbling cleaning can be conducted while repeating swelling of the hollow fiber membrane bundle during gas supply and shrinkage at the time of stop of gas supply, a cleaning effect of an outer circumference portion of the hollow fiber membrane bundle can be more enhanced as compared with a case where gas is continuously supplied into the housing. Additionally, repetition of swelling and shrinkage of the hollow fiber membrane bundle applies a cleaning effect different from that caused by fluctuation of a membrane. Further, it is possible to change the path in the hollow fiber membrane bundle for passing of bubble flow every gas supply cycle by intermittently supplying gas to the housing. This makes an amount of passing gas become more uniform in a cross sectional view of the hollow fiber membrane bundle, thereby making the cleaning effect be hardly nonuniform.

(14) In the above cleaning method of the hollow fiber membrane module, a countercurrent bubbling can be executed in the lower-side bubbling step. In the countercurrent bubbling, a water stream of raw water is generated in the internal space along a longitudinal direction of the hollow fiber membrane, and a bubble flow in an opposite direction to the water stream is generated along the longitudinal direction of the hollow fiber membrane in the internal space.

With this method, strong shearing force is generated by collision between a water stream and a bubble flow in directions opposite to each other, and the shearing force enables the hollow fiber membrane to be effectively cleaned. This enables suspended solids and the like attached to the surface of the hollow fiber membrane to be efficiently removed. Moreover, generating a water stream and a bubble flow along the longitudinal direction of the hollow fiber membrane makes strong shearing force act over a wide range of the hollow fiber membrane in the longitudinal direction, resulting in uniform clearing of the hollow fiber membrane. Accordingly, with the above cleaning method of the hollow fiber membrane module, strong shearing force enables effective and uniform cleaning of the hollow fiber membrane.

(15) In the above cleaning method of the hollow fiber membrane module, a gas-liquid cleaning may be conducted in the upper-side bubbling step. In the gas-liquid cleaning, raw water and gas are simultaneously jetted toward the upper space from a plurality of holes of a pipe member arranged in the internal space.

With this method, a gas-liquid mixture enables strong shearing force to be generated in the internal space, and with the shearing force, the surface of the hollow fiber membrane can be effectively cleaned. As a result, suspended solids and the like attached to the surface of the hollow fiber membrane can be efficiently removed.

(16) The above cleaning method of the hollow fiber membrane module may further comprise a shower cleaning step. In the shower cleaning step, the hollow fiber membrane bundle is cleaned by jetting water in shower toward the internal space from a plurality of holes of a pipe member arranged in the internal space, after water in the housing has been drained.

With this method, in a hollow fiber membrane bundle, a part to which water is directly applied moves upon receiving force from the water. At this time, since a surrounding space is filled with air, the membrane is easy to move. Therefore, it is possible to generate shearing force in a hollow fiber membrane bundle, thereby effectively cleaning the hollow fiber membrane bundle. Additionally, since falling-down of the water on the surface of the hollow fiber membrane bundle due to gravity also enables generation of shearing force in the hollow fiber membrane bundle, the hollow fiber membrane bundle can be cleaned also by water falling down on the hollow fiber membrane bundle.

The invention claimed is:

1. A hollow fiber membrane module of an external pressure filtering type, the hollow fiber membrane module comprising:
   a hollow fiber membrane bundle comprising a plurality of hollow fiber membranes;
   a housing having a bottom surface and an internal space in which the hollow fiber membrane bundle is housed;
   a gas diffusing member arranged in the housing below the hollow fiber membrane bundle and above the bottom surface of the housing, the gas diffusing member having a shape extending in a radial direction of the hollow fiber membrane bundle and configured to receive gas for cleaning the hollow fiber membrane from outside the housing; and
   a pipe member extending in an up-down direction inside the hollow fiber membrane bundle and penetrating the bottom surface of the housing,
   wherein the pipe member has a plurality of pipe vent holes above a center of the hollow fiber membrane bundle in a longitudinal direction thereof such that the plurality of pipe vent holes functions as an upper-side gas supply portion which discharges gas for cleaning the hollow fiber membrane bundle from an inner space of the pipe member at a position above the center of the hollow fiber membrane bundle in the longitudinal direction,
   the gas diffusing member has a plurality of diffusing vent holes such that the plurality of diffusing vent holes functions as a lower-side gas supply portion which discharges gas for cleaning the hollow fiber membrane bundle below the center of the hollow fiber membrane bundle in the longitudinal direction,
   the housing has a gas extraction port for discharging gas in the internal space to an outside of the housing, and a drain extraction port for discharging liquid in the internal space to the outside of the housing, the drain extraction port positioned below the gas extraction port,
   the housing has a diffusing gas entrance for supplying gas to the gas diffusing member, the diffusing gas entrance located in the bottom surface of the housing below the gas diffusing member at a position different from a position where the pipe member penetrates the bottom surface, and
   the plurality of pipe vent holes includes at least one first pipe vent hole above a lower face of the gas extraction port and at least one second pipe vent hole below the lower face of the gas extraction port.

2. The hollow fiber membrane module according to claim 1, wherein
   the pipe member further has at least one third pipe vent hole below the center of the hollow fiber membrane bundle in the longitudinal direction thereof, and
   the hollow fiber membrane module is configured such that raw water to be filtered by the hollow fiber membranes passes through the first, second, and third pipe vent holes so as to be supplied into the housing.

3. The hollow fiber membrane module according to claim 2, wherein
   a number of the pipe vent holes in a circumferential direction of the pipe member is larger than a number of the at least one third pipe vent hole in the circumferential direction of the pipe member.

4. The hollow fiber membrane module according to claim 2, wherein the pipe member and the gas diffusing member are each connected to different gas supply means.

5. The hollow fiber membrane module according to claim 2, wherein the gas diffusing member comprises:
   a plate-shaped main body portion having a shape extending in the radial direction of the hollow fiber membrane bundle such that the diffusing vent holes are formed at intervals in the radial direction; and
   a gas receiving portion having a cylindrical shape with one end connected to a back face of the main body portion and the other end on which a gas reception port is formed,
   wherein the gas reception port has a dispersion hole for guiding gas housed in the gas receiving portion to the diffusing vent holes, and
   the gas receiving portion has a shape with an inner diameter spreading from the one end toward the other end.

6. The hollow fiber membrane module according to claim 2, wherein
   the hollow fiber membrane module is configured such that raw water to be filtered by the hollow fiber membranes is supplied into the housing only from the first, second, and third pipe vent holes of the pipe member.

7. The hollow fiber membrane module according to claim 1, wherein the pipe member does not have a pipe vent hole below the center of the hollow fiber membrane bundle in the longitudinal direction thereof.

8. The hollow fiber membrane module according to claim 7, wherein the pipe member and the gas diffusing member are each connected to different gas supply means.

9. The hollow fiber membrane module according to claim 7, wherein the gas diffusing member comprises:
   a plate-shaped main body portion having a shape extending in the radial direction of the hollow fiber membrane bundle such that the diffusing vent holes are formed at intervals in the radial direction; and
   a gas receiving portion having a cylindrical shape with one end connected to a back face of the main body portion and the other end on which a gas reception port is formed,
   wherein the gas reception port has a dispersion hole for guiding gas housed in the gas receiving portion to the diffusing vent holes, and
   the gas receiving portion has a shape with an inner diameter spreading from the one end toward the other end.

10. The hollow fiber membrane module according to claim 1, wherein the pipe member and the gas diffusing member are each connected to different gas supply means.

11. The hollow fiber membrane module according to claim 1, wherein the gas diffusing member comprises:
    a plate-shaped main body portion having a shape extending in the radial direction of the hollow fiber membrane bundle such that the diffusing vent holes are formed at intervals in the radial direction; and
    a gas receiving portion having a cylindrical shape with one end connected to a back face of the main body portion and the other end on which a gas reception port is formed,
    wherein the gas reception port has a dispersion hole for guiding gas housed in the gas receiving portion to the diffusing vent holes, and
    the gas receiving portion has a shape with an inner diameter spreading from the one end toward the other end.

12. The hollow fiber membrane module according to claim 1, wherein the pipe member has a section portion which sections an inner space of the pipe member into a lower-side tube inner space positioned below the center of the hollow fiber membrane bundle in the longitudinal direction and an upper-side tube inner space positioned above the lower-side tube inner space, gas supply means for supplying gas to each of the upper-side tube inner space and the lower-side tube inner space is provided, the first pipe vent hole and the second pipe vent hole are facing to the upper-side tube inner space, and the pipe member further has at least one third pipe vent hole below the center of the hollow fiber membrane bundle in the longitudinal direction thereof such that the third pipe vent hole is facing to the lower-side tube inner space.

13. The hollow fiber membrane module according to claim 1, wherein
the hollow fiber membrane bundle is one-end-free type in which an upper end of the hollow fiber membranes is fixed and a lower end of the hollow fiber membranes is not fixed one by one.

14. The hollow fiber membrane module according to claim 1, wherein
the hollow fiber membrane module is configured such that raw water to be filtered by the hollow fiber membranes is supplied into the housing only through the pipe member.

15. A method of cleaning a hollow fiber membrane module of an external pressure filtering type in which a hollow fiber membrane bundle having a plurality of hollow fiber membranes is housed in an internal space of a housing by dispersing gas in the internal space filled with water, wherein the housing has a gas extraction port for discharging gas in the internal space to an outside of the housing, and the hollow fiber membrane module has a pipe member extending in an up-down direction inside the hollow fiber membrane bundle and having a plurality of pipe vent holes including at least one first pipe vent hole above a lower face of the gas extraction port and at least one second pipe vent hole below the lower face of the gas extraction port, the method comprising:
a lower-side bubbling step of discharging the gas from a position below a lower space of the internal space of the housing in which a lower-side part of the hollow fiber membrane bundle below a center of the hollow fiber membrane bundle in a longitudinal direction is positioned, thereby cleaning the hollow fiber membrane; and subsequently an upper-side bubbling step of discharging the gas from the first pipe vent hole formed above the lower face of the gas extraction port in an upper space of the internal space of the housing in which an upper-side part of the hollow fiber membrane bundle above the center of the hollow fiber membrane bundle in the longitudinal direction is positioned, thereby cleaning the hollow fiber membrane, wherein in the upper-side bubbling step, water in the internal space of the housing flows into the pipe member through the second pipe vent hole, and water in the pipe member jets into the upper space together with the gas through the first pipe vent hole above a liquid surface in the internal space of the housing to clean the hollow fiber membrane.

16. The method according to claim 15, wherein
at least in one of the lower-side bubbling step and the upper-side bubbling step, an intermittence bubbling is executed such that bubbling on and bubbling off are repeated, wherein in the bubbling on, the gas is supplied to the housing for a predetermined time period, and in the bubbling off, supply of the gas to the housing is stopped for a predetermined time period.

17. The method according to claim 16, wherein the intermittence bubbling is executed only in the lower-side bubbling step.

18. The method according to claim 15, wherein
the housing further has a drain extraction port for discharging liquid in the internal space to an outside the housing, a countercurrent bubbling is executed in the lower-side bubbling step such that, in the countercurrent bubbling, a water stream of raw water is generated in the internal space along the longitudinal direction of the hollow fiber membrane bundle by discharging liquid in the internal space to the outside of the housing through the drain extraction port, and a bubble flow in an opposite direction to the water stream is generated along the longitudinal direction of the hollow fiber membrane bundle in the internal space.

19. The method according to claim 15, wherein
a gas-liquid cleaning is conducted in the upper-side bubbling step such that, in the gas-liquid cleaning, raw water and gas are simultaneously jetted toward the upper space from the plurality of pipe vent holes of the pipe member arranged in the internal space.

20. The method according to claim 15, further comprising:
a shower cleaning step in which the hollow fiber membrane bundle is cleaned by jetting water in shower toward the internal space from the plurality of pipe vent holes of the pipe member arranged in the internal space, after water in the housing has been drained.

* * * * *